(12) United States Patent
Honjo et al.

(10) Patent No.: US 8,218,069 B2
(45) Date of Patent: Jul. 10, 2012

(54) CAMERA BODY WITH WHICH VARIOUS FLASH DEVICES CAN BE INTERCHANGEABLY USED

(75) Inventors: Kenichi Honjo, Osaka (JP); Hideki Yoshida, Osaka (JP); Keizo Ishiguro, Nara (JP); Takayuki Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 12/561,778

(22) Filed: Sep. 17, 2009

(65) Prior Publication Data
US 2010/0073551 A1    Mar. 25, 2010

(30) Foreign Application Priority Data

Sep. 19, 2008    (JP) ................. 2008-240478

(51) Int. Cl.
  *H04N 5/222*    (2006.01)
  *H04N 5/232*    (2006.01)
  *G03B 13/00*    (2006.01)
(52) U.S. Cl. .................. 348/371; 348/349
(58) Field of Classification Search .......... 396/106, 396/107, 108, 165, 198; 348/370, 371
See application file for complete search history.

(56) References Cited

U.S. PATENT DOCUMENTS

| | | | | |
|---|---|---|---|---|
| 4,618,235 A | * | 10/1986 | Ishida et al. | 396/96 |
| 4,693,582 A | * | 9/1987 | Kawamura et al. | 396/104 |
| 5,357,297 A | * | 10/1994 | Jeong et al. | 396/61 |
| 7,769,287 B2 | * | 8/2010 | Sakamoto | 396/125 |
| 2002/0030755 A1 | * | 3/2002 | Uchino | 348/342 |
| 2002/0135692 A1 | | 9/2002 | Fujinawa | |
| 2007/0104480 A1 | | 5/2007 | Shiozaki et al. | |
| 2007/0280671 A1 | | 12/2007 | Kosaka | |
| 2008/0106630 A1 | * | 5/2008 | Matsuda et al. | 348/333.01 |
| 2009/0040332 A1 | * | 2/2009 | Yoshino et al. | 348/222.1 |

FOREIGN PATENT DOCUMENTS

| | | |
|---|---|---|
| JP | 08-334682 A | 12/1996 |
| JP | 2003-125418 A | 4/2003 |
| JP | 2003-302570 A | 10/2003 |
| JP | 2005-352208 A | 12/2005 |
| JP | 2007-127836 A | 5/2007 |
| JP | 2007-322741 A | 12/2007 |

\* cited by examiner

*Primary Examiner* — Albert Cutler
(74) *Attorney, Agent, or Firm* — Panasonic Patent Center; Dhiren Odedra; Kerry Culpepper

(57) ABSTRACT

The camera body includes an imaging element, a hot shoe, an internal light source, and a camera controller. The imaging element is configured to convert an optical image of the subject into an electrical signal, and is configured to produce image data for the subject. The hot shoe allows the flash device to be mounted. The internal light source is arranged to shine light on the subject. The camera controller is configured to calculate an evaluation value on the basis of the image data produced by the imaging element, and is configured to perform video autofocusing on the basis of the evaluation value. The camera controller controls the imaging element and the internal light source so that when the camera controller decides that the auxiliary light is needed, and the camera controller decides that the flash device mounted to the hot shoe has an external auxiliary light source arranged to emit near infrared light, the internal light source emits light during the video autofocusing and the image data is acquired.

10 Claims, 15 Drawing Sheets

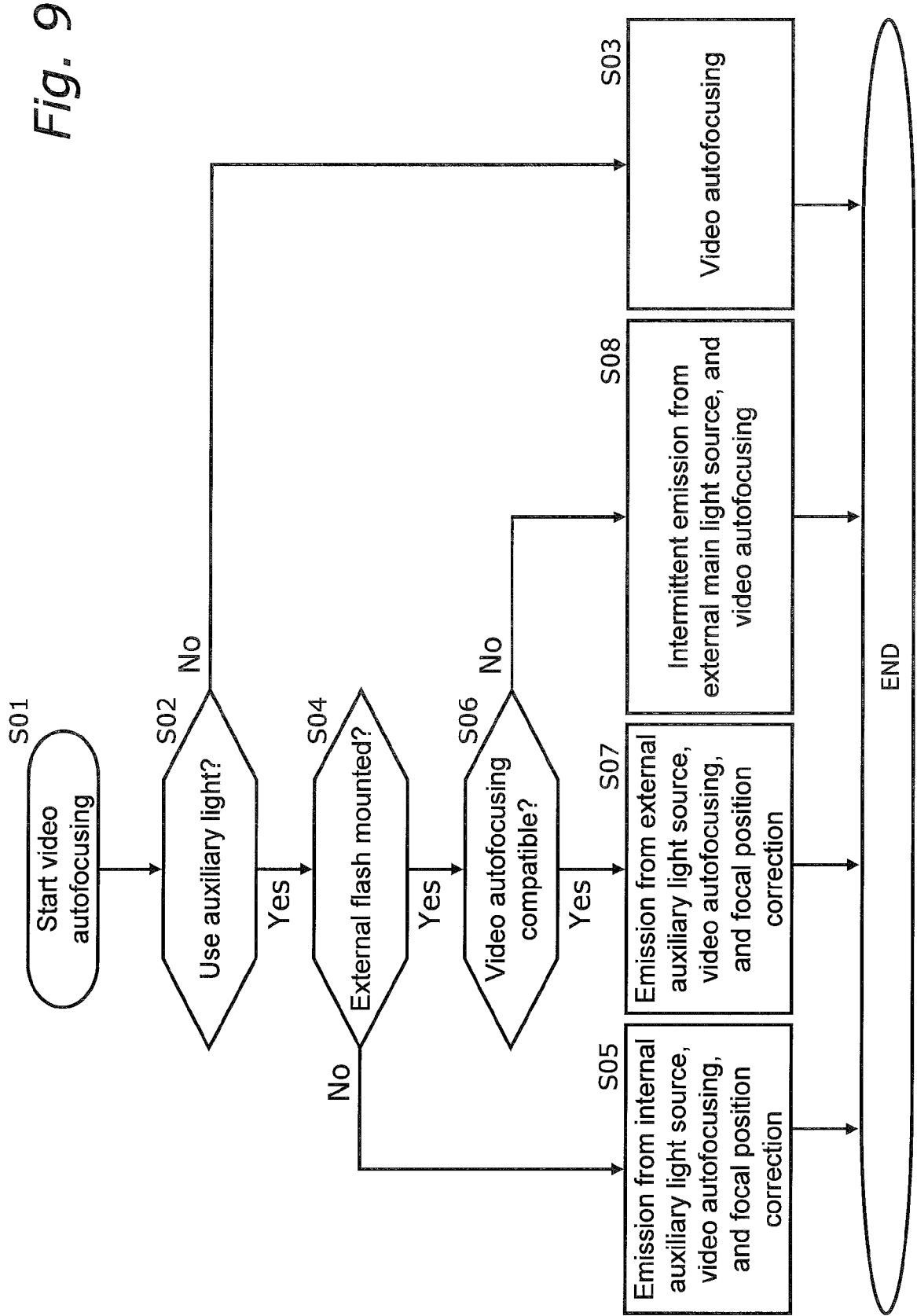

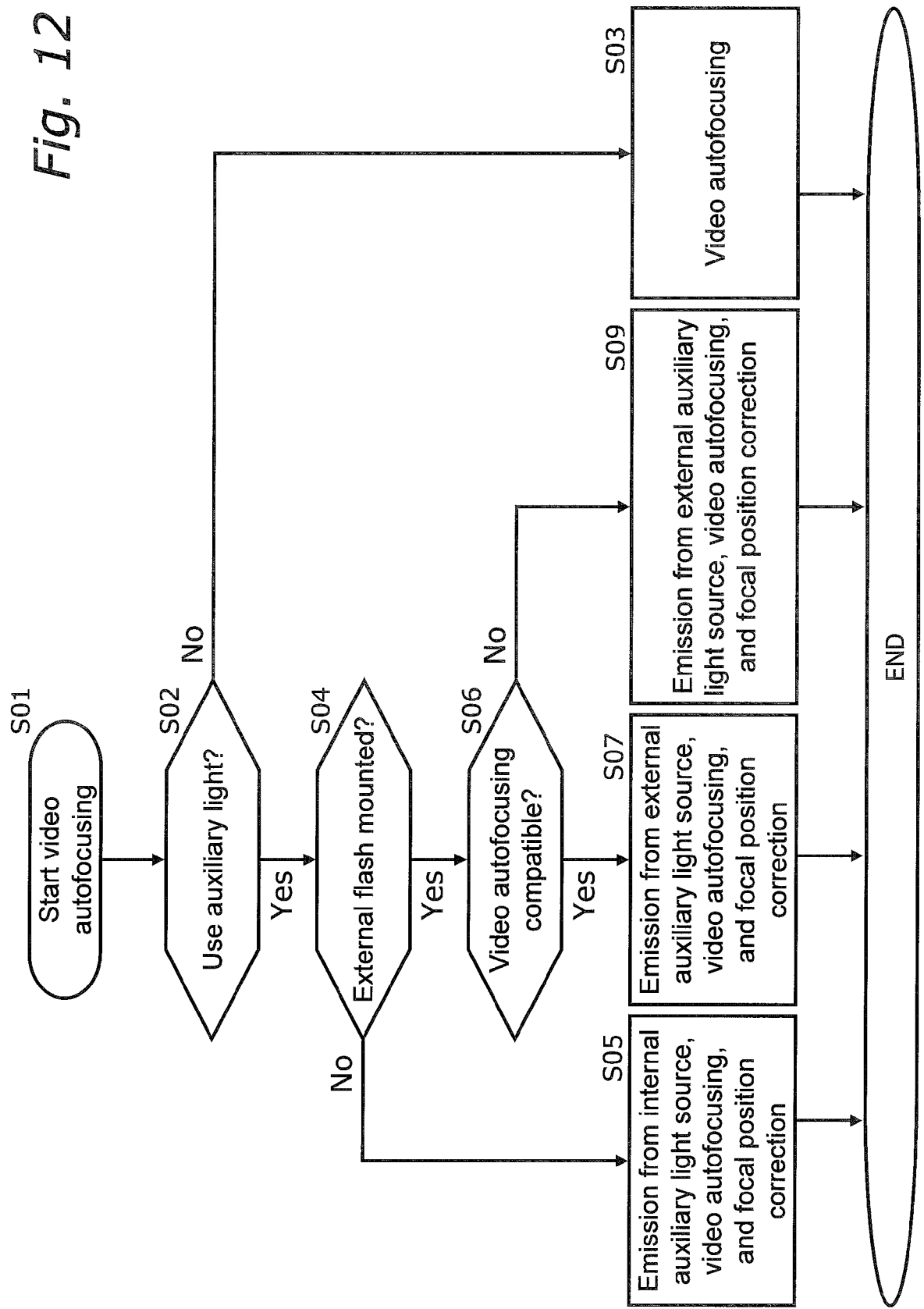

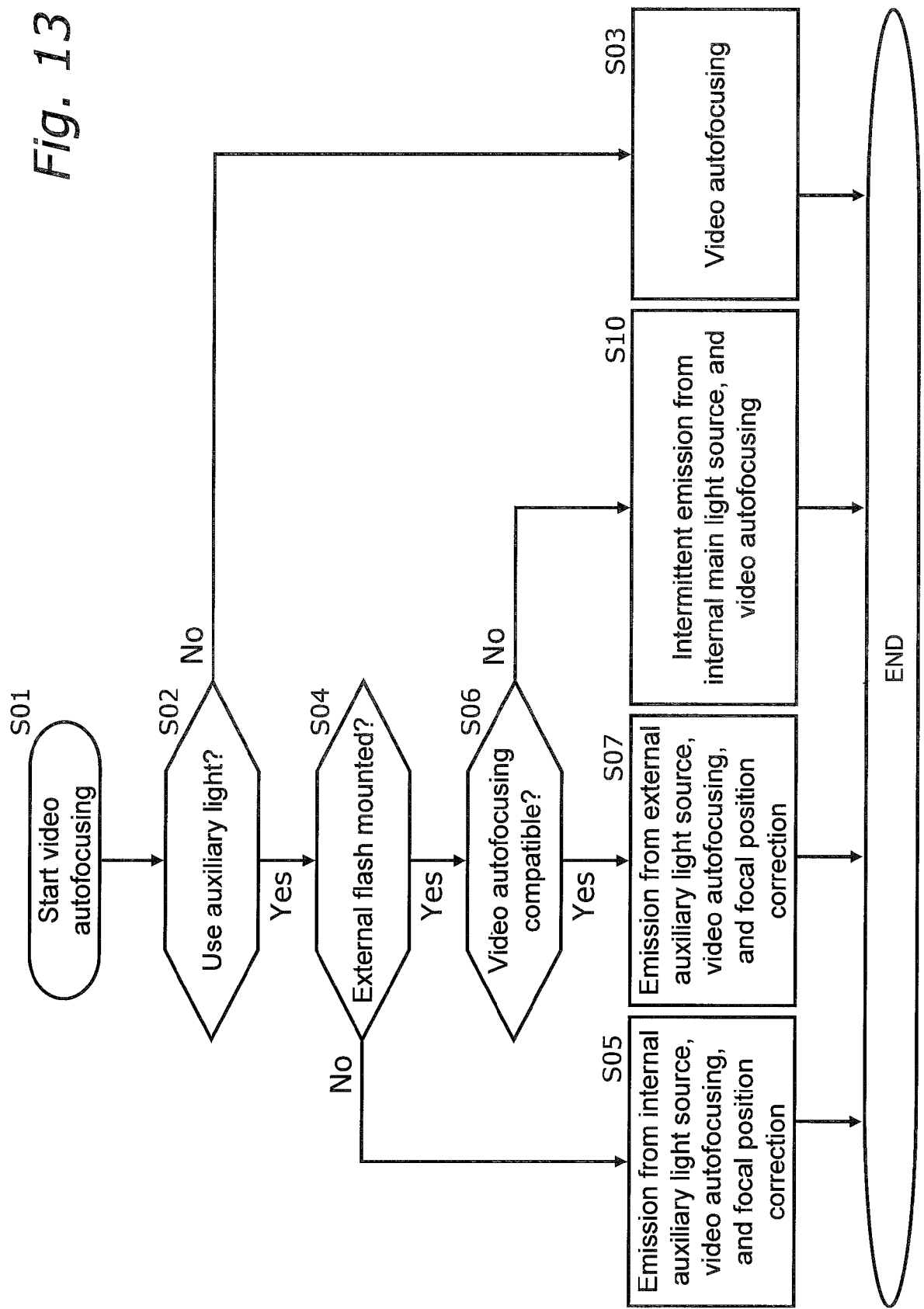

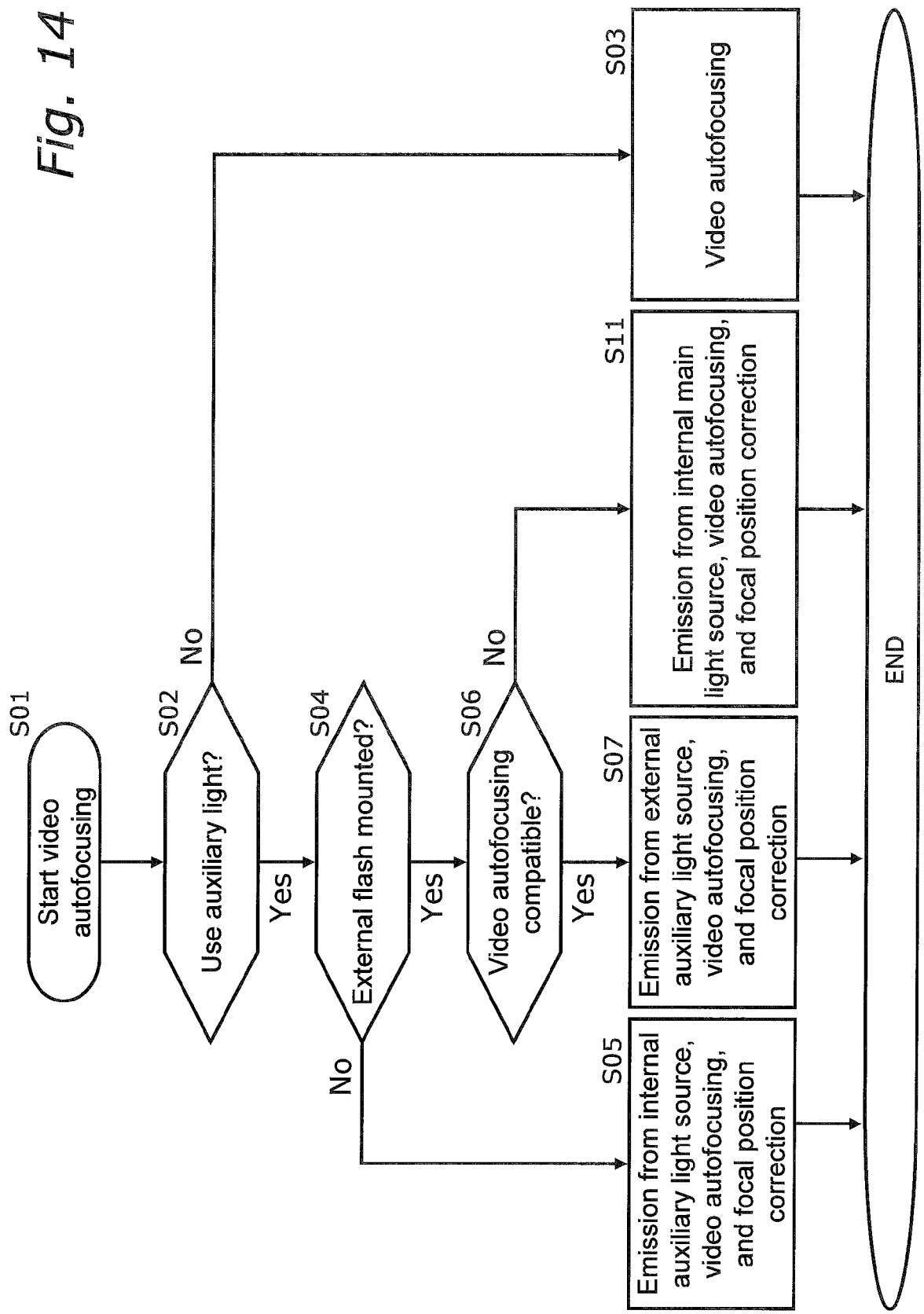

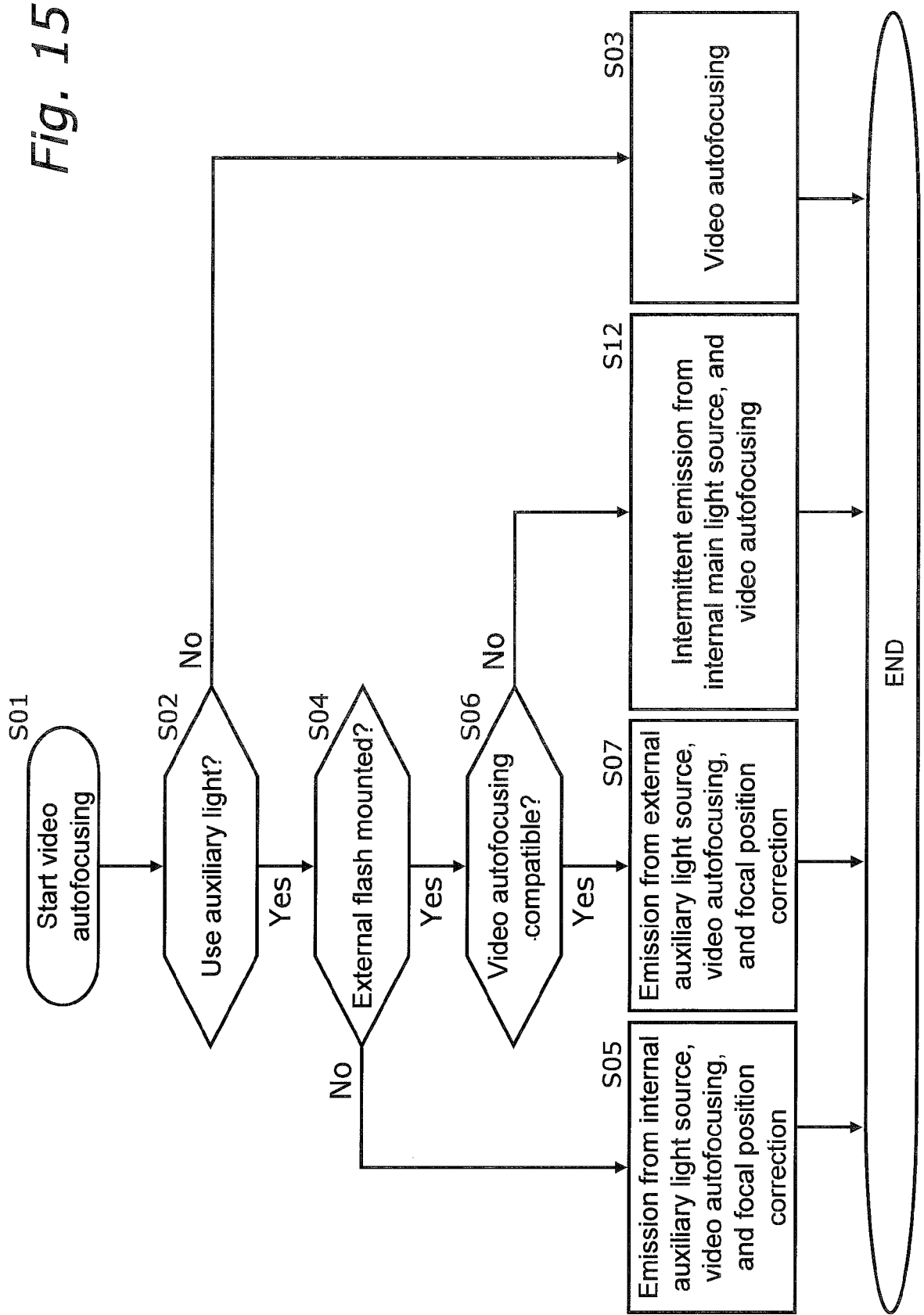

CAMERA BODY WITH WHICH VARIOUS FLASH DEVICES CAN BE INTERCHANGEABLY USED

CROSS-REFERENCE TO RELATED APPLICATIONS

This application claims priority to Japanese Patent Application No. 2008-240478 filed on Sep. 19, 2008. The entire disclosure of Japanese Patent Application No. 2008-240478 is hereby incorporated herein by reference.

TECHNICAL FIELD

The technology disclosed herein relates to a camera body to which an external flash device can be mounted.

DESCRIPTION OF THE RELATED ART

Japanese Laid-Open Patent Application 2007-127836 discloses a single lens reflex camera. This camera has a lens unit and a camera body. The camera body is equipped with a CCD (Charge Coupled Device) image sensor, and a mirror box device disposed between the lens unit and the CCD image sensor. The mirror box device guides the subject light flux from the lens unit to either the CCD image sensor or a prism. The subject light flux guided to the prism is guided by the prism to a viewfinder.

SUMMARY

However, it is difficult to reduce the size of the camera body with an interchangeable lens digital camera of this type because the camera body is equipped with a mirror box device.

In view of this, the inventors of the present invention came up with a novel interchangeable lens digital camera that has no mirror box device. Also, in the course of further development of a novel interchangeable lens digital camera, the inventors discovered that there are cases when it is impossible to use the auxiliary light of the flash device that is used along with a conventional single lens reflex camera as long as an autofocus based on image data produced by an imaging element (hereinafter also referred to as video AF (video autofocus)) is employed.

It is an object of the technology disclosed herein to provide a camera body with which interchangeability with a variety of flash devices can be ensured.

The camera body disclosed herein allows the mounting of a lens unit for forming an optical image of a subject and a flash device for shining light on the subject. This camera body includes an imaging element, a hot shoe, an internal light source, and a camera controller. The imaging element is configured to convert an optical image of the subject into an electrical signal, and is configured to produce image data for the subject. The hot shoe allows a flash device to be mounted. The internal light source is arranged to shine light on the subject. The camera controller is configured to calculate an evaluation value on the basis of the image data produced by the imaging element, and is configured to perform video autofocusing on the basis of the evaluation value. The camera controller controls the imaging element and the internal light source so that when the camera controller decides that an auxiliary light is needed, and the camera controller decides that the flash device mounted to the hot shoe has an external auxiliary light source arranged to emit near infrared light, the internal light source emits light during video autofocusing and the image data is acquired.

With this camera body, when the camera controller decides that the auxiliary light is needed, and the camera controller decides that the flash device mounted to the hot shoe has an external auxiliary light source arranged to emit near infrared light, the imaging element and the internal light source are controlled by the camera controller so that the internal light source emits light during video autofocusing and the image data is acquired. Accordingly, even when a flash device having an external auxiliary light source arranged to emit light, that is, a flash device that is not compatible with video autofocusing, is mounted to the hot shoe, video autofocusing can still be performed using the internal light source, and there is no drop in video autofocusing accuracy even with a flash device that is not compatible with video autofocusing. In other words, interchangeability with various flash devices can be ensured with this camera body.

The auxiliary light referred to here includes not only light emitted by a flash device, but also light emitted by the internal light source built into the camera body. Whether or not to use auxiliary light can be decided, for example, by a forced emission mode, an emission prohibited mode, an automatic emission mode, or another such light emission mode.

The term video autofocusing here means autofocusing on the basis of image data produced by an imaging element. Further, the external auxiliary light source of the flash device is a light source used in an auxiliary capacity, and has a smaller output than the external main light source of the flash device

BRIEF DESCRIPTION OF THE DRAWINGS

Referring now to the attached drawings, which form a part of this original disclosure:

FIG. 9 is a flowchart related to the use of auxiliary light during video autofocusing (first embodiment);
FIG. 12 is a flowchart related to the use of auxiliary light during video autofocusing (second embodiment);
FIG. 13 is a flowchart related to the use of auxiliary light during video autofocusing (third embodiment);
FIG. 14 is a flowchart related to the use of auxiliary light during video autofocusing (fourth embodiment);
and FIG. 15 is a flowchart related to the use of auxiliary light during video autofocusing (fifth embodiment).

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1: Configuration 1-1: Overview of Digital Camera

Figure 1:
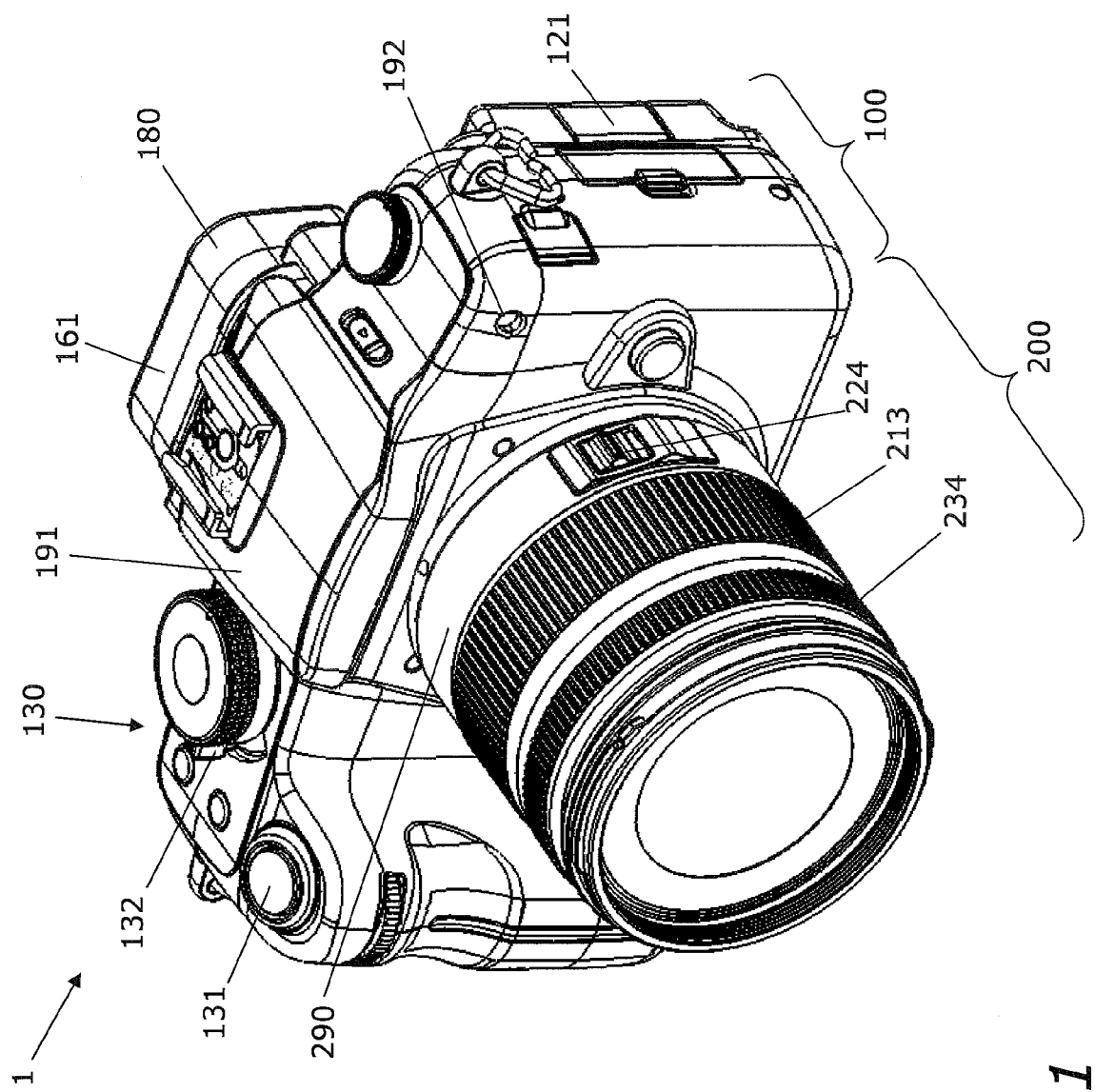
FIG. 1 is an oblique view of a digital camera 1.
Figure 2:
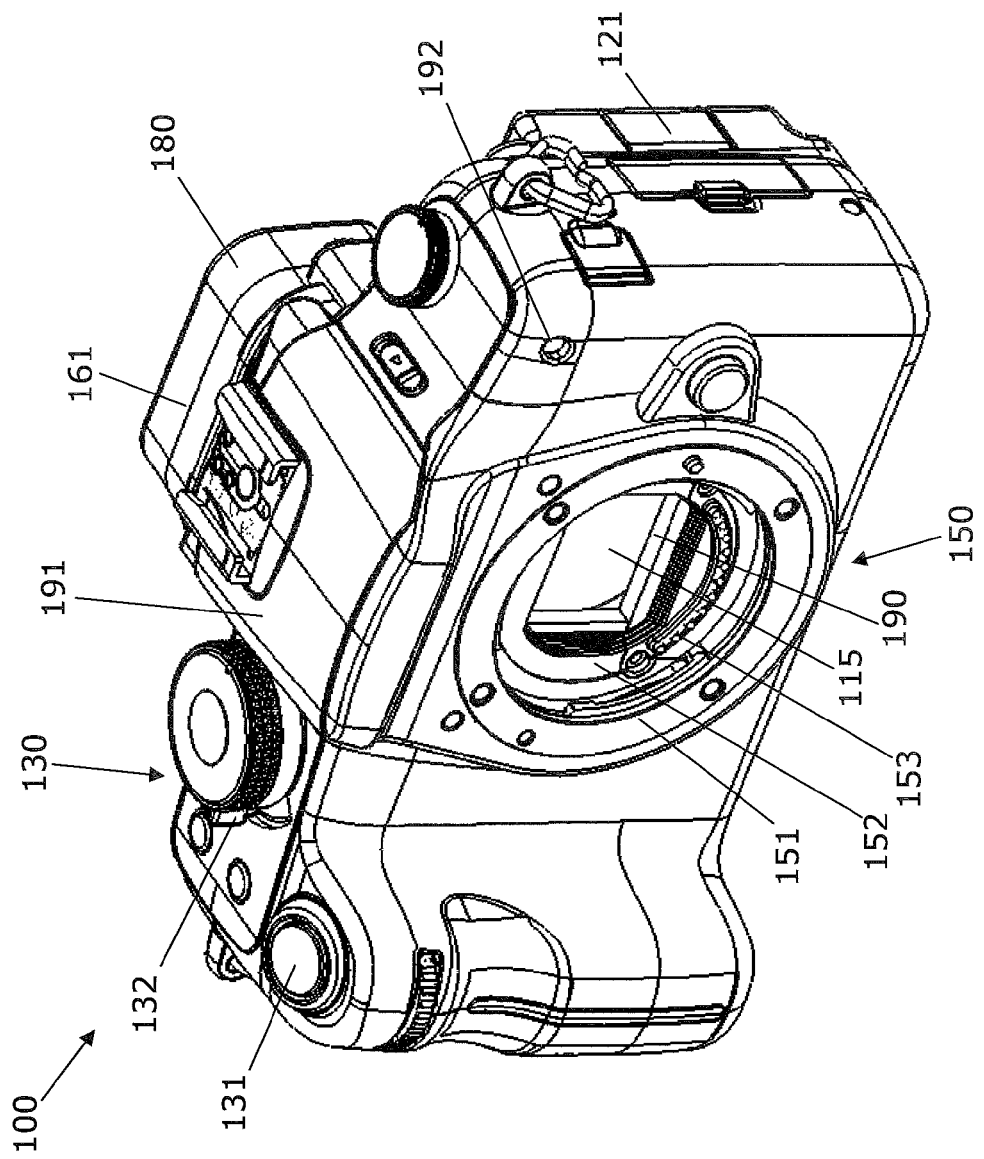
FIG. 2 is an oblique view of a camera body 100.
Figure 3:
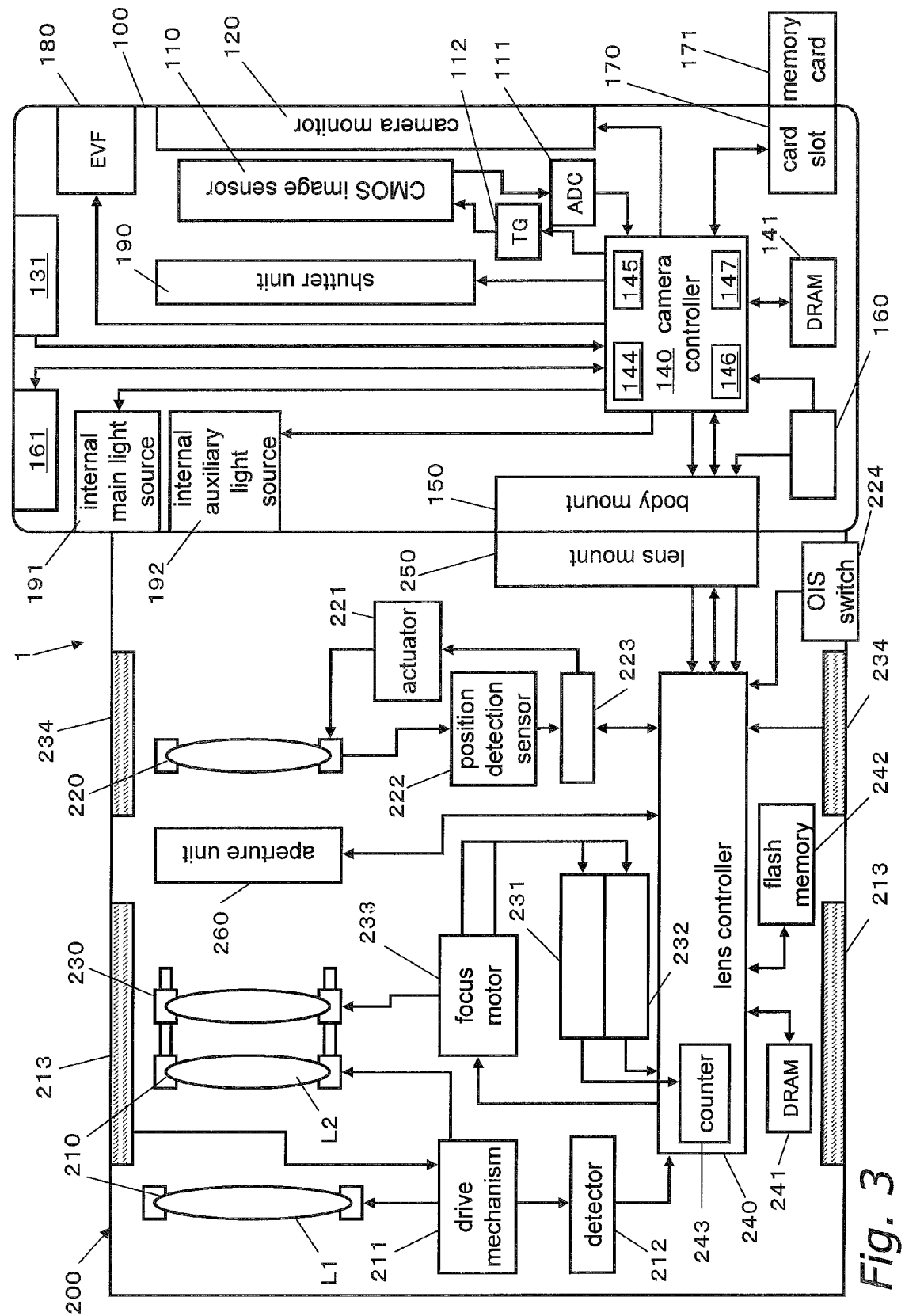
FIG. 3 is a block diagram of the digital camera 1.

As shown in FIGS. 1 to 3, a digital camera 1 according to the first embodiment comprises a camera body 100 and a lens unit 200 that can be mounted to the camera body 100.

Unlike with a single lens reflex camera, the camera body 100 has no mirror box device, so its flange-back is smaller than that of a single lens reflex camera. Reducing the flange-back also allows the camera body 100 to be made more compact. Furthermore, reducing the flange-back affords greater latitude in design of the optical system, so the lens unit 200 can be made more compact.

For the sake of convenience in the following description, the subject side of the digital camera 1 will be referred to as the front, the opposite side of the digital camera 1 from the subject as the rear or back, the vertical upper side when the digital camera 1 is in its normal orientation (hereinafter also referred to as landscape orientation) as the top, and the vertical lower side as the bottom.

1-2: Configuration of Camera Body

Figure 4:
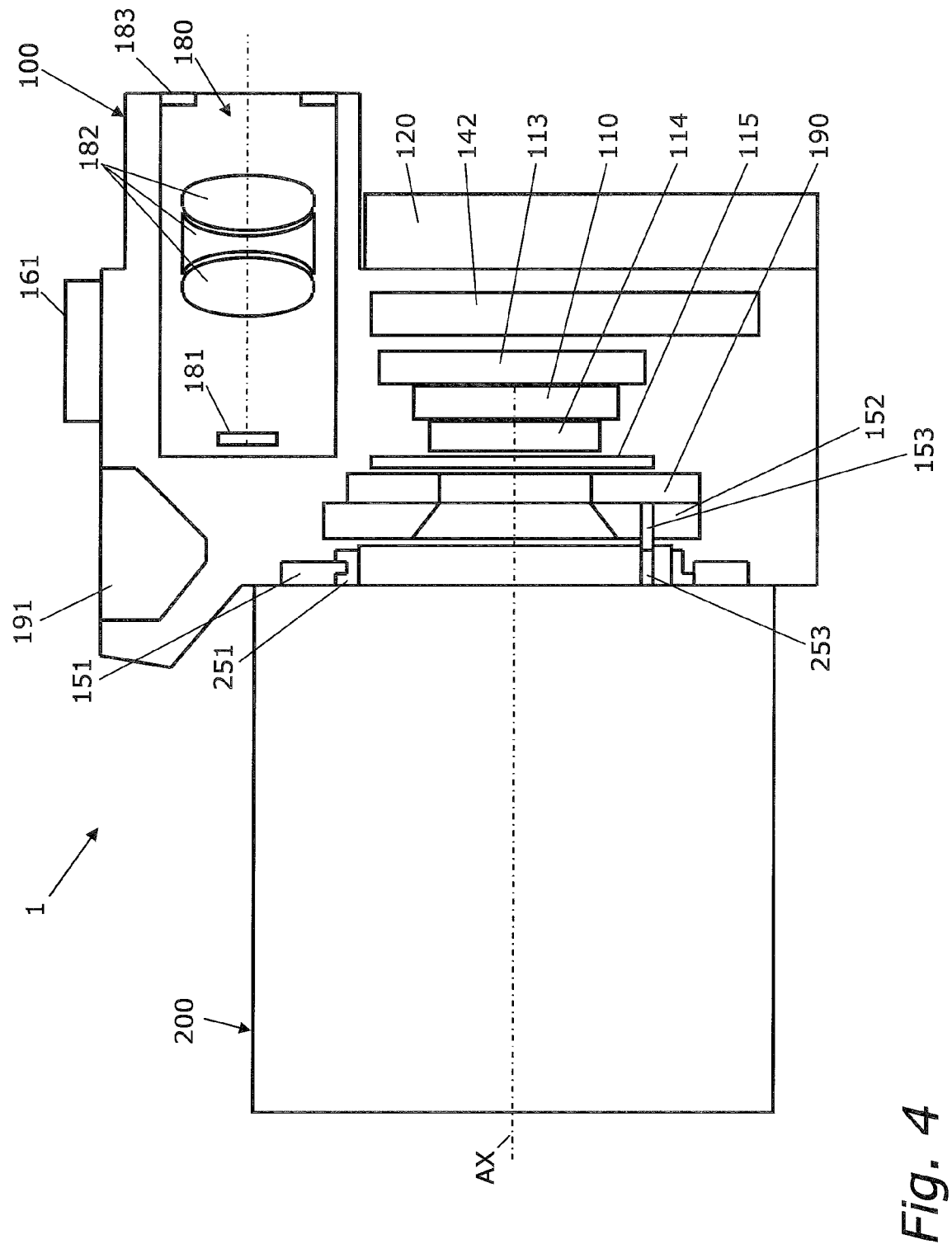
FIG. 4 is a simplified cross section of the digital camera 1.
Figure 5:
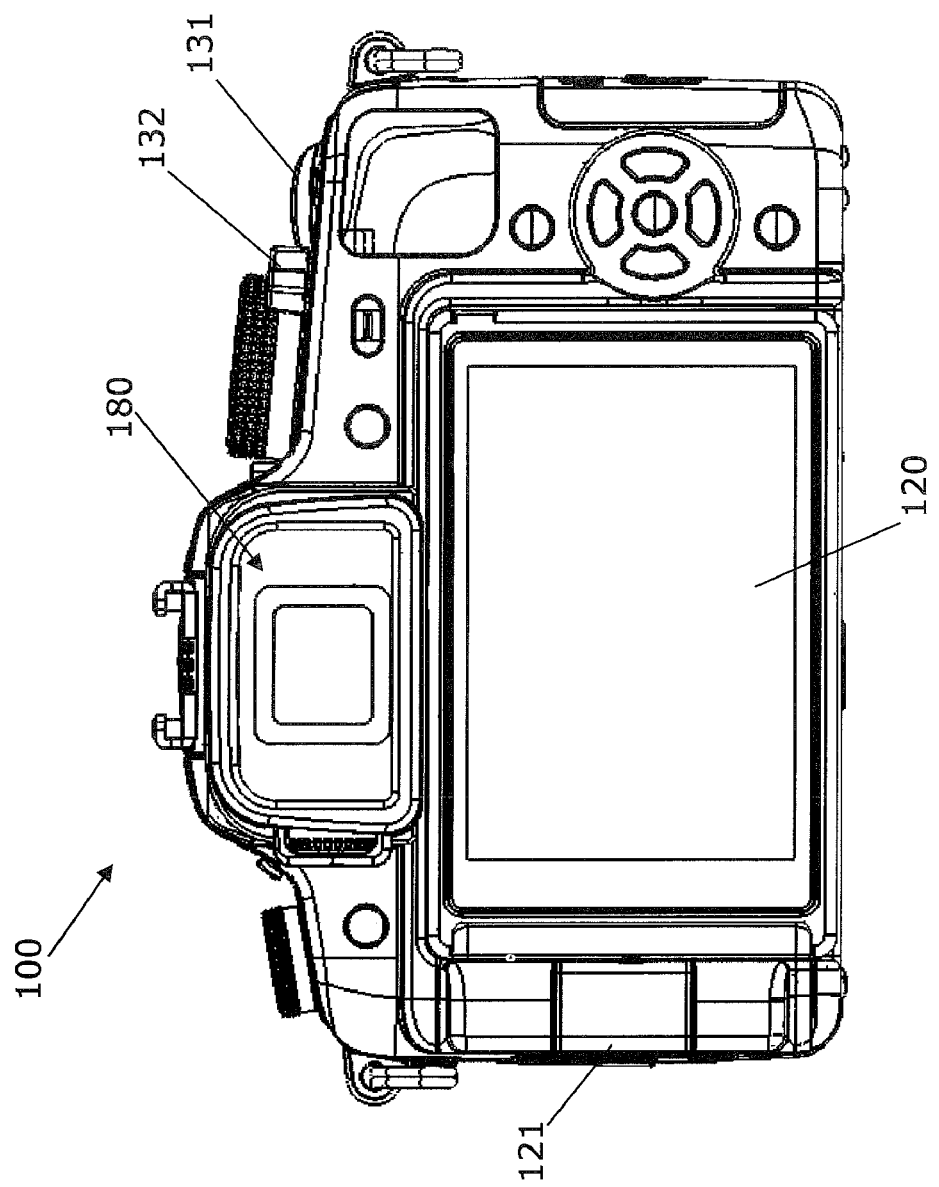
FIG. 5 is a rear view of the camera body 100.

As shown in FIGS. 4 and 5, the camera body 100 mainly comprises a CMOS (complementary metal oxide semiconductor) image sensor 110, a CMOS circuit board 113, a camera monitor 120, a control unit 130, a main circuit board 142 that includes a camera controller 140, a body mount 150, a power supply 160, a card slot 170, an electronic viewfinder 180, a shutter unit 190, an optical filter 114, a diaphragm 115, an internal main light source 191 (an example of an internal light source), an internal auxiliary light source 192 (an example of an internal light source), a hot shoe 161, and a housing member 101.

The body mount 150, the shutter unit 190, the diaphragm 115, the optical filter 114, the CMOS image sensor 110, the CMOS circuit board 113, the main circuit board 142, and the camera monitor 120 are disposed in that order, starting from the front of the camera body 100.

The CMOS image sensor 110 converts an optical image of the subject (hereinafter also referred to as a subject image) formed by the lens unit 200 into an electrical signal, and produces image data about the subject. More specifically, the CMOS image sensor 110 has an opto-electrical conversion layer capable of storing electrical charges by opto-electrical conversion, and a color filter layer provided to the front face of the opto-electrical conversion layer. The opto-electrical conversion layer has a plurality of pixels, and each pixel is capable of storing an electrical charge by opto-electrical conversion. The color filter layer has a plurality of blue color filters that only transmit blue light, a plurality of green color filters that only transmit green light, and a plurality of red color filters that only transmit red light. The blue, green, and red color filters are disposed in a one-on-one correspondence with the pixels on the front face of each pixel of the opto-electrical conversion layer. The CMOS image sensor 110 is able to amplify signals from pixels where blue color filters are disposed, signals from pixels where green color filters are disposed, and signals from pixels where red color filters are disposed. The CMOS image sensor 110 produces image data on the basis of these signals.

The image data that is produced is digitized by an A/D converter 111 (discussed below) of the CMOS circuit board 113. The image data digitized by the A/D converter 111 is subjected to various image processing by the camera controller 140. The various image processing referred to here includes, for example, gamma correction processing, white balance correction processing, scratch correction processing, white balance correction processing, scratch correction processing, YC conversion processing, electronic zoom processing, and JPEG compression processing.

The CMOS image sensor 110 operates on the basis of a timing signal controlled by a timing generator 112. The CMOS image sensor 110 can perform acquisition of still picture data and moving picture data under control by the CMOS circuit board 113. The moving picture data thus acquired is also used for the display of through-images.

A "through-image" here is an image out of the image data that is not recorded to a memory card 171. Through-images are primarily moving pictures, and are displayed on the camera monitor 120 and the electronic viewfinder 180 (hereinafter also referred to as EVF) to decide the composition of a moving or still picture.

The CMOS image sensor 110 is an example of an imaging element that converts an optical image of a subject into an electrical image. The imaging element is a concept that encompasses the CMOS image sensor 110 as well as a CCD image sensor or other such opto-electrical conversion element.

The CMOS circuit board 113 is a circuit board that controls the drive of the CMOS image sensor 110. The CMOS circuit board 113 is also a circuit board that subjects the image data outputted from the CMOS image sensor 110 to specific processing, and as shown in FIG. 3, includes the timing generator 112 and the A/D converter 111. The CMOS circuit board 113 is an example of an imaging element circuit board that controls the drive of the imaging element and subjects the image data outputted from the imaging element to A/D conversion and other such specific processing.

The camera monitor 120 is a liquid crystal display, for example, and displays display-use image data as an image. The display-use image data is image data that has undergone image processing, or data for displaying the photography conditions of the digital camera 1, a control menu, or the like as an image, and is produced by the camera controller 140, for example. The camera monitor 120 is capable of selectively displaying both moving and still pictures.

As shown in FIG. 5, the camera monitor 120 is disposed on the rear face of the camera body 100. The camera monitor 120 may be disposed anywhere on the camera body 100. The camera monitor 120 is such that the angle of the display screen can be varied with respect to the housing member 101. More specifically, as shown in FIGS. 1, 2, and 5, the camera body 100 has a hinge 121 that rotatably links the housing member 101 and the camera monitor 120. The hinge 121 is disposed at the left end of the camera body 100 as viewed from the rear face side in landscape orientation. The hinge 121 has a first rotation axis disposed parallel to the vertical direction in landscape orientation, and a second rotation axis disposed parallel to the horizontal plane in landscape orientation. The orientation of the camera monitor 120 with respect to the housing member 101 can be changed as desired by rotating the camera monitor 120 around the first and second rotation axes.

The camera monitor 120 is an example of a display unit provided to the camera body 100. Other examples include an organic electroluminescence unit, and inorganic electroluminescence unit, a plasma display panel, and other such devices that allow images to be displayed. The display unit need not be disposed on the rear face of the camera body 100, and may instead be provided to a side face, the top face, or another such place.

The electronic viewfinder 180 displays the display-use image data produced by the camera controller 140 as an image. The EVF 180 is capable of selectively displaying both moving and still pictures. The EVF 180 and the camera monitor 120 may display the same or different content, and both are controlled by the camera controller 140. The EVF 180 has an EVF-use liquid crystal monitor 181 that displays images and the like, an EVF-use optical system 182 that enlarges the display of the EVF-use liquid crystal monitor, and an eyepiece 183 up to which the user puts an eye.

The EVF 180 is also an example of a display unit. The EVF 180 differs from the camera monitor 120 in that the user puts an eye up to it. The difference in terms of structure is that whereas the EVF 180 has the eyepiece 183, the camera monitor 120 does not have an eyepiece 183.

The proper display brightness of the EVF-use liquid crystal monitor 181 is ensured by providing a back light (not shown) in the case of a transmission type of liquid crystal, and a front light in the case of a reflection type of liquid crystal. The EVF-use liquid crystal monitor 181 is an example of an EVF-use monitor. The EVF-use monitor can be an organic electroluminescence unit, and inorganic electroluminescence unit, a plasma display panel, or another such device that allows images to be displayed. There is no need for an illumination light source in the case of an organic electroluminescence unit or other such self-emitting device.

The control unit 130 receives commands from the user. More specifically, as shown in FIGS. 1 and 2, the control unit 130 has a release button 131 that is used for shutter operation by the user, and a power switch 132 that is a rotary dial switch provided to the top face of the camera body 100. The release button 131 is used for shutter operations by the user. The power switch 132 is such that the power is off in a first rotation position, and the power is on in a second rotation position. The control unit 130 encompasses a button, lever, dial, touch panel, or the like, so long as it can be operated by the user.

The camera controller 140 is disposed on the main circuit board 142, and controls the entire camera body 100, including the CMOS image sensor 110 and other such components. The camera controller 140 is electrically connected to the control unit 130, and control signals are inputted from the control unit 130. The camera controller 140 uses a DRAM 141 as a working memory during control operations and image processing operations.

The camera controller 140 sends a signal for controlling the lens unit 200 to a lens controller 240 via the body mount 150 and a lens mount 250, and indirectly controls the components of the lens unit 200. The camera controller 140 also receives various kinds of signals from the lens controller 240 via the body mount 150 and the lens mount 250. Specifically, the camera controller 140 controls the entire digital camera 1. The camera controller 140 is an example of a body controller.

The camera controller 140 has a CPU (central processing unit), a ROM (read only memory, and a RAM (random access memory), and various functions can be carried out by reading programs stored in the ROM into the CPU. The functions of the camera controller 140 will be discussed below.

The card slot 170 allows the memory card 171 to be inserted. The card slot 170 controls the memory card 171 on the basis of control from the camera controller 140. More specifically, the card slot 170 stores image data on the memory card 171 and outputs image data from the memory card 171. For example, the card slot 170 stores image data on the memory card 171 and outputs moving picture data from the memory card 171.

The memory card 171 is able to store the image data produced by the camera controller 140 in image processing. For instance, the memory card 171 can store uncompressed raw image files, compressed JPEG image files, or the like. Also, image data or image files that have been internally stored ahead of time can be outputted from the memory card 171 via the card slot 170. The image data or image files outputted from the memory card 171 are subjected to image processing by the camera controller 140. For example, the camera controller 140 produces display-use image data by subjecting the image data acquired from the memory card 171 to expansion, etc.

The memory card 171 is further able to store video data produced by the camera controller 140 in image processing. For instance, the memory card 171 can store video files compressed according to H.264/AVC, which is a video compression standard. The memory card 171 can also output, via the card slot 170, video data or video files internally stored ahead of time. The video data or video files outputted from the memory card 171 are subjected to image processing by the camera controller 140. For example, the camera controller 140 subjects the video data or video files acquired from the memory card 171 to expansion processing and produces display-use video data.

The memory card 171 is also an example of a recording unit that records electrical signals produced by the imaging element. The recording unit may be one that can be mounted to the camera body 100, such as the memory card 171, or may be one that is built into the digital camera 1.

The power supply 160 supplies electrical power to the various components of the digital camera 1. The power supply 160 may, for example, be a dry cell, or may be a rechargeable cell. The power supply 160 also may be an external power supply that supplies power to the digital camera 1 via a power cord or the like.

The body mount 150 allows the lens unit 200 to be mounted, and supports the lens unit 200 in a state in which the lens unit 200 is mounted. The body mount 150 can be mechanically and electrically connected with the lens mount 250 of the lens unit 200. Data and/or control signals can be sent and received between the camera body 100 and the lens unit 200 via the body mount 150 and the lens mount 250. More specifically, data and/or control signals can be sent and received between the body mount 150 and the lens mount 250, and between the camera controller 140 and the lens controller 240. The body mount 150 supplies power received from the power supply 160 to the entire lens unit 200 via the lens mount 250.

More specifically, the body mount 150 includes a body mount ring 151 and a body mount contact support part 152. The body mount ring 151 is either in a state of being mated with a lens mount ring 251 or a state of not being mounted, depending on the rotational position relation to the lens mount ring 251 of the lens unit 200 around the optical axis AX. Specifically, when the rotational position relation of the body mount ring 151 and the lens mount ring 251 is in a first state, the lens mount ring 251 is not mated with the body mount ring 151, and the lens mount ring 251 is able to move in a direction parallel to the optical AX with respect to the body mount ring 151 (hereinafter referred to as the optical axis direction). That is, the lens mount ring 251 can be removed from the body mount ring 151.

When the lens mount ring 251 is inserted into the body mount ring 151 in the first state, and the lens mount ring 251 is rotated with respect to the body mount ring 151, the lens mount ring 251 mates with the body mount ring 151. If we call the rotational position relation between the body mount ring 151 and the lens mount ring 251 here a second state, then when the rotational position relation is in the second state, the body mount ring 151 mechanically supports the lens unit 200. Since the body mount ring 151 mechanically supports the lens unit 200, the body mount ring 151 needs to have a certain amount of strength. Therefore, the body mount ring 151 is preferably formed from metal.

The body mount contact support part 152 is disposed between the body mount ring 151 and the shutter unit 190, and has a plurality of electrical contacts 153. In a state in which the lens unit 200 is mounted to the body mount 150, the plurality of electrical contacts 153 are in respective contact with a plurality of electrical contacts 253 had by the lens mount 250. In a state in which the electrical contacts 153 of the body mount 150 are in contact with the electrical contacts 253 of the lens mount 250, the body mount 150 and the lens mount 250 can be electrically connected. Also, the supply of power and the exchange of data and control signals are performed between the camera body 100 and the lens unit 200 via the electrical contacts 153 of the body mount 150 and the electrical contacts 253 of the lens mount 250.

As shown in FIG. 2, the body mount contact support part 152 has an opening, and is disposed between the body mount ring 151 and the shutter unit 190.

The shutter unit 190 is what is known as a focal plane shutter, and is disposed between the body mount 150 and the CMOS image sensor 110. The shutter unit 190 can maintain an open state mechanically. The shutter unit 190 is controlled by the camera controller 140 so that an open state is maintained when power is shut off to the camera body 100. The concept of mechanically maintaining an open state here means that the open state is maintained without the use of electrical power. Specific examples of ways to maintain an open state mechanically include a configuration in which a specific member is used to support a front curtain and a rear curtain at a position corresponding to the open state, and a configuration in which the front curtain and the rear curtain are supported at a position corresponding to the open state by the force of a permanent magnet.

The optical filter 114 has the function of an optical low-pass filter that eliminates the high-frequency component of the subject light. More specifically, the optical filter 114 separates a subject image formed by the lens unit 200 so that the resolution is coarser than the pitch of the pixels of the CMOS image sensor 110. In general, an imaging element such as the CMOS image sensor has an RGB color filter called a Bayer pattern, or a YCM complementary color filter, provided for each pixel. Therefore, if the resolution goes to one pixel, not only will a false color be generated, but if the subject is a repeating pattern, an unattractive moire will result. Furthermore, the optical filter 114 has an Ir cut filter function for cutting out infrared light with a wavelength of approximately 700 nm or higher.

The diaphragm 115 is disposed in front (the subject side) of the CMOS image sensor 110, and prevents dust from clinging to the CMOS image sensor 110. Also, any dust clinging to the diaphragm 115 itself is knocked off by the vibration of the diaphragm 115. More specifically, the diaphragm 115 has a thin, transparent sheet-like member and a piezoelectric element that imparts vibration to the sheet-like member. The piezoelectric element is fixed to a frame (not shown). AC voltage is applied to the piezoelectric element, which causes the piezoelectric element to vibrate, and this vibrates the sheet-like member and knocks off any dust clinging to the sheet-like member.

The internal main light source 191 is a light source that shines flash light on the subject and, during moving picture capture, illuminates the subject by shining a flash at the subject. The internal main light source 191 is controlled by the camera controller 140. In this embodiment, the flash of the internal main light source 191 is white light.

The internal auxiliary light source 192 is a light source for shining light on the subject during autofocusing, and emits visible light that includes the color red. In this embodiment, the internal auxiliary light source 192 emits light in which the wavelength of the peak intensity of the spectral characteristics is 612 nm. The internal auxiliary light source 192 is an LED, for example.

The hot shoe 161 is disposed at the upper part of the camera body 100. An external flash or other such flash device can be mounted to the hot shoe 161. When a flash device is mounted to the hot shoe 161, the flash device is supported by the hot shoe 161. The hot shoe 161 has a data signal terminal 162, an XSW signal terminal 163, and an external flash detection terminal 164, and comes into contact with the terminals of the external flash 300. Consequently, the camera body 100 and the external flash 300 can be synchronized, and the external flash 300 can emit light in conjunction with the operating timing of the shutter (or the charge accumulation timing of the CMOS image sensor 110). If the internal main light source 191 and the internal auxiliary light source 192 are made smaller, they emit less light, and not enough light may reach a distant subject, but greater photographic freedom is ensured for the user by being able to mount the external flash 300, which emits more light.

1-3: Configuration of Lens Unit

The lens unit 200 comprises an optical system, the lens controller 240, the lens mount 250, an aperture unit 260, and a lens barrel 290. The optical system of the lens unit 200 includes a zoom lens 210, an OIS lens 220, and a focus lens 230. The optical system is housed in the interior of the lens barrel 290. A zoom ring 213, a focus ring 234 and an OIS switch 224 are provided on the outside of the lens barrel.

The zoom lens 210 is used to change the magnification of an optical image of a subject (hereinafter also referred to as a subject image) formed by the optical system of the lens unit 200, or in other words, to change the focal distance of the optical system. The zoom lens 210 is made up of one or more lenses. The zoom lens 210 includes a first lens group L1 and second lens group L2 of the optical system. The focal distance of the optical system changes when the zoom lens 210 moves in a direction parallel to the optical axis AX.

The zoom ring 213 is a cylindrical member that is able to rotate on the outer peripheral face of the lens barrel 290. The zoom ring 213 is an example of a zoom control that adjusts the focal distance, and is an example of a zoom control that decides the focal distance according to the position after operation.

When the user operates the zoom ring 213, a drive mechanism 211 transmits this operation to the zoom lens 210, and moves the zoom lens 210 along the optical axis AX direction of the optical system.

A detector 212 detects the amount of drive of the drive mechanism 211. The lens controller 240 and/or the camera controller 140 acquires a detection result from this detector 212, and ascertains the focal distance in the optical system. Also, the lens controller 240 and/or the camera controller 140 acquires a detection result from this detector 212, and ascertains the position of the zoom lenses (L1, L2, etc.) at a position in the optical axis AX direction within the lens unit 200. The drive mechanism 211 should be able to move the zoom lens 210 in the optical axis AX direction. For example, the drive mechanism 211 may transfer the drive force from a motor or other such drive force generator to the zoom lens 210 according to the rotational position of the zoom ring 213 or another such control, and move the zoom lens 210 to a position in the optical axis AX direction that corresponds to the rotational position of the zoom ring 213.

The OIS lens 220 is used to correct blurring of a subject image formed by the optical system of the lens unit 200. The OIS lens 220 corrects blurring of the subject image caused by shake of the digital camera 1. When the OIS lens 220 is moved in the direction in which the OIS lens 220 cancels out shake of the digital camera 1, relative shake between the CMOS image sensor 110 and the subject image is reduced. The OIS lens 220 is made up of one or more lenses. An actuator 221 is controlled by an OIS-use IC 223 and drives the OIS lens 220 within a plan perpendicular to the optical axis AX of the optical system.

The actuator 221 can comprise, for example, a magnet and a planar coil. A position detection sensor 222 detects the position of the OIS lens 220 within a plane perpendicular to the optical axis AX. The position detection sensor 222 can comprise, for example, a magnet and a Hall element. The OIS-use IC 223 controls the actuator 221 on the basis of a detection result of a gyro sensor or other such shake detector and a detection result of the position detection sensor 222. The OIS-use IC 223 obtains a detection result of the shake detector from the lens controller 240. The OIS-use IC 223 also sends the lens controller 240 a signal indicating the status of optical image blur correction processing.

The OIS lens 220 is an example of a blur corrector. Electronic blur correction that produces image data corrected on the basis of image data from the CMOS image sensor 110 may be employed as a means for correcting blurring of the subject image caused by shake of the digital camera 1. Also, a configuration in which the CMOS image sensor 110 is driven within a plane perpendicular to the optical axis AX of the optical system may be used as a means for reducing relative shake between the CMOS image sensor 110 and the subject image caused by shake of the digital camera 1.

The OIS switch 224 is an example of a control for operating the OIS. When the OIS switch 224 is switched off, the OIS lens 220 does not operate. When the OIS switch 224 is switched on, the OIS lens 220 is able to operate.

The focus lens 230 is used to change the focal state of the subject image formed on the CMOS image sensor 110 by the optical system. The focus lens 230 is made up of one or more lenses. The zoom lens 210 changes the focal state of the subject image by moving in a direction parallel to the optical axis AX of the optical system.

A focus motor 233 drives the focus lens 230 so that it moves back and forth along the optical axis AX, under control by the lens controller 240. Consequently, the focal state of the subject image formed on the CMOS image sensor 110 by the optical system can be changed. The focus motor 233 can drive the focus lens 230 independently from the drive of the zoom lens 210. More specifically, the focus motor 233 drives the focus lens 230 in the optical axis AX direction using the second lens group L2 as a reference. In other words, the focus motor 233 is able to change the relative distance between the second lens group L2 and the focus lens 230 in the optical axis AX direction. The focus lens 230 and the focus motor 233 move in the optical axis AX direction along with the second lens group L2. Therefore, when the second lens group L2 moves in the optical axis AX direction because of zoom operation, the focus lens 230 and the focus motor 233 also move in the optical axis AX direction. Also, the focus motor 233 can drive the focus lens 230 in the optical axis AX direction using the second lens group L2 as a reference even in a state in which the second lens group L2 is stopped in the optical axis AX direction. The focus motor 233 can be a DC motor, a stepping motor, a servo motor, an ultrasonic motor, or the like.

A relative position detector 231 and an absolute position detector 232 are encoders that produce signals indicating the drive state of the focus lens 230. The relative position detector 231 has a magnetic scale and a magnetic sensor, and detects magnetic changes and outputs signals corresponding to magnetic changes. An example of a magnetic sensor is an MR sensor. The absolute position detector 232 is a home detector that detects the home position of the focus lens 230 with respect to the second lens group L2. The absolute position detector 232 is a photosensor, for example. The lens controller 240 recognizes that the focus lens 230 is at its home point from a signal from the absolute position detector 232. At this point the lens controller 240 resets the value of a counter 243 that is provided internally. This counter 243 counts the extreme values of magnetic changes by using signals outputted from the relative position detector 231. Consequently, the lens controller 240 is able to ascertain the position of the focus lens 230 in the optical axis AX direction with respect to the second lens group L2 by detecting the relative position from the home position, which is an absolute position. Also, as mentioned above, the lens controller 240 is able to ascertain the position of the second lens group L2 in the optical axis AX direction within the lens unit 200. Therefore, the lens controller 240 is able to ascertain the position of the focus lens 230 in the optical axis AX direction within the lens unit 200.

The aperture unit 260 is a light quantity adjusting member that adjust the quantity of light transmitted by the optical system. The aperture unit 260 has aperture vanes that can block part of the light rays transmitted by the optical system, and an aperture driver that adjusts the quantity of light by driving the aperture vanes and varying the amount of blockage thereof. The camera controller 140 controls the operation of the aperture unit 260 on the basis of the quantity of light received by the CMOS image sensor 110, whether still picture or moving picture photography is to be performed, whether or not there is an operation to which an aperture value is preferentially set, and so forth.

The lens controller 240 controls the various components of the lens unit 200, such as the OIS-use IC 223 and the focus motor 233, on the basis of control signals from the camera controller 140. The lens controller 240 also receives signals from the detector 212, the OIS-use IC 223, the relative position detector 231, the absolute position detector 232, and so forth, and sends these to the camera controller 140. The lens controller 240 communicates with the camera controller 140 via the lens mount 250 and the body mount 150. The lens controller 240 uses a DRAM 241 as a working memory during controlling. Also, a flash memory 242 stores programs and parameters used in control by the lens controller 240.

1-4: External Flash

Figure 6:
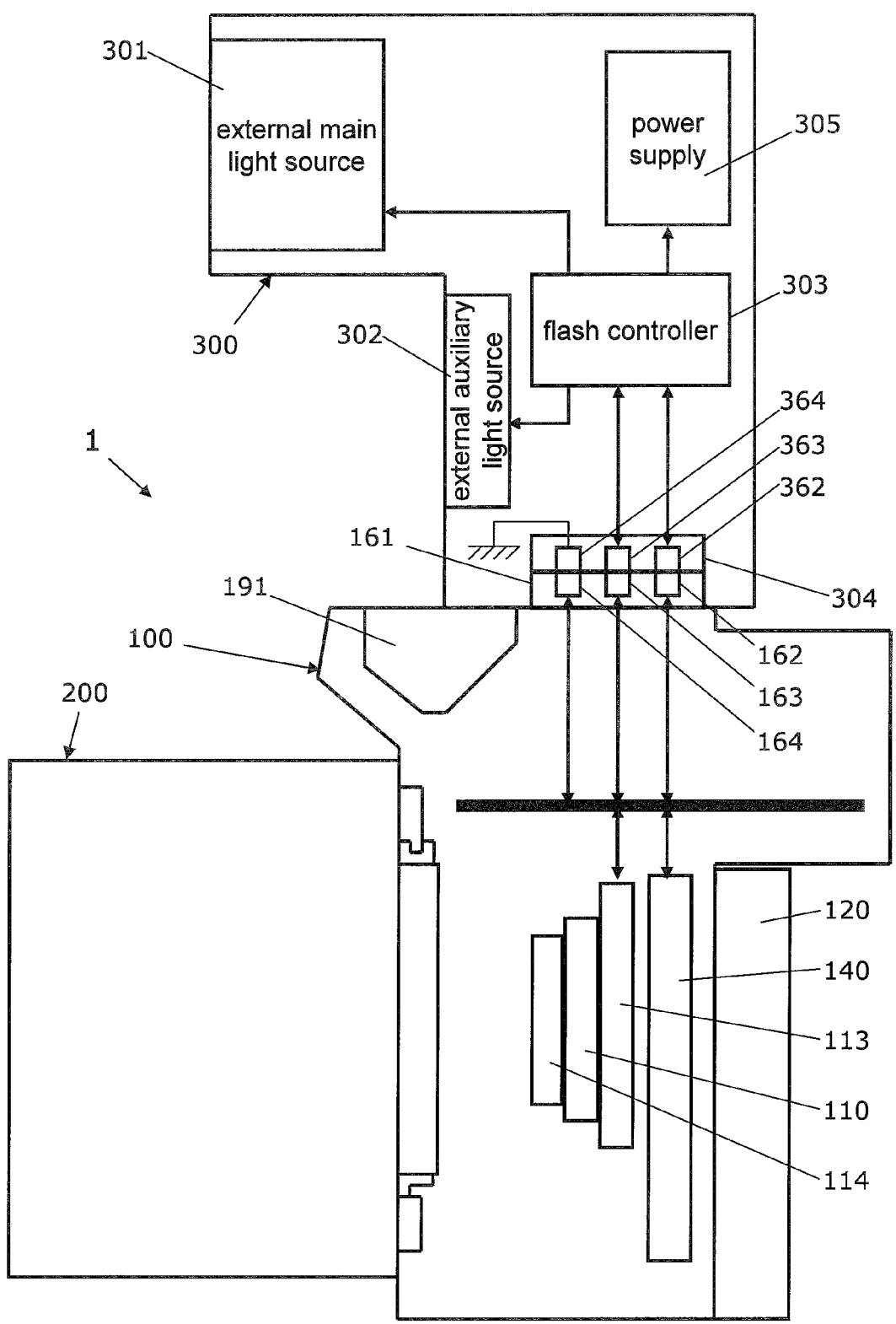
FIG. 6 is a block diagram of the digital camera 1 to which an external flash 300 is mounted.

FIG. 6 is a block diagram of the digital camera 1 when an external flash 300 (an example of a flash device) is mounted. The external flash 300 comprises the external main light source 301, an external auxiliary light source 302, a flash controller 303, a hot shoe mount 304, and a power supply 305.

The hot shoe mount 304 is mounted to the hot shoe 161 of the camera body 100. The hot shoe mount 304 has a data signal terminal 362, an XSW signal terminal 363, and an external flash detection terminal 364. The terminals 362, 363, and 364 are in contact with the data signal terminal 162, the XSW signal terminal 163, and the external flash detection terminal 164 of the camera body 100, respectively. The data signal terminal 362 and the XSW signal terminal 363 are connected to the flash controller 303. The external flash detection terminal 364 is connected to an electrical ground.

The flash controller 303 controls the various components of the external flash 300, such as the external main light source 301 and the external auxiliary light source 302. The external main light source 301 emits a white flash under the control of the flash controller 303. The external auxiliary light source 302 emits visible light including red light under the control of the flash controller 303. In this embodiment, the light is emitted in which the wavelength of the peak intensity of the spectral characteristics is 612 nm. The power supply 305 supplies power to the various components of the external flash 300.

When the external flash 300 is mounted to the camera body 100, the external flash detection terminal 164 and the external flash detection terminal 364 are electrically connected. An external flash detector 144 of the camera controller 140 detects if the voltage of the external flash detection terminal 164 is at ground level, and thereby decides whether or not the external flash 300 is mounted to the hot shoe 161.

Figure 7:
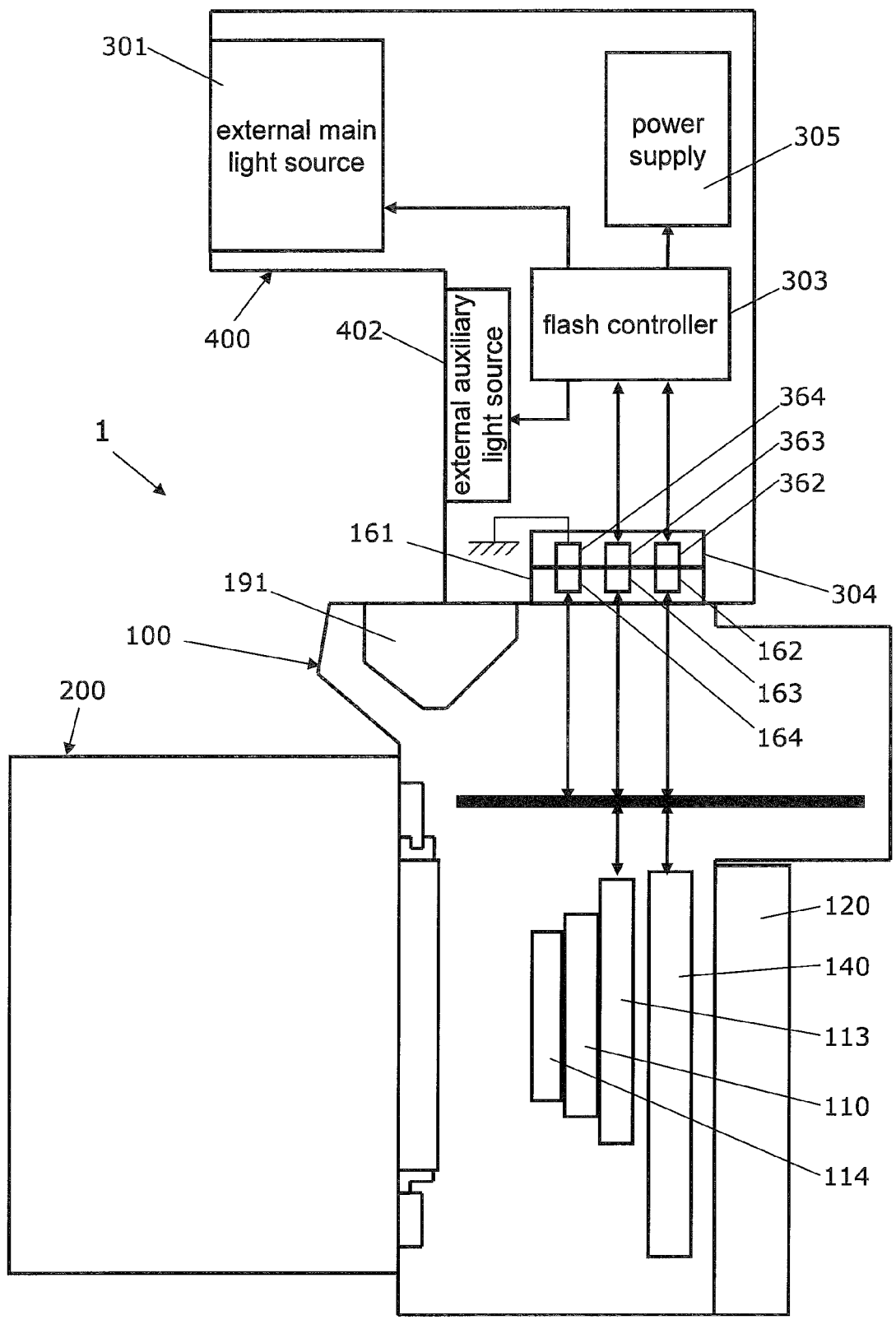
FIG. 7 is a block diagram of the digital camera 1 to which an external flash 400 is mounted.

FIG. 7 is a block diagram of the digital camera 1 when an external flash 400 (an example of a flash device) of a comparative example is mounted. With this external flash 400, the light emitted by an external auxiliary light source 402 is usually near infrared light. This is because light with a long wavelength such as near infrared light is less susceptible to attenuation and tends to travel farther, and because light with a long wavelength such as near infrared light is more readily detected by the phase difference detection units commonly used with single lens reflex cameras. Another reason for using near infrared light is that humans do not perceive it to be bright. The term "near infrared light" refers to light whose wavelength is at least about 700 nm, for example, and more specifically refers to light in which the wavelength of the peak energy intensity of the spectral characteristics is at least about 700 nm. The term "spectral characteristics" refers to the energy intensity distribution seen for each wavelength had by the emitted light. These spectral characteristics are also called the emission spectrum.

The external auxiliary light source 302 of the external flash 300 is characterized in that it emits light of a shorter wavelength than the light emitted by the external auxiliary light source 402 of the external flash 400 in a comparative example.

1-5: Camera Controller

As discussed above, the camera controller 140 has various functions. For example, as shown in FIG. 3, it has the external flash detector 144, an external flash decision part 145 (an example of a flash device decision part), an auxiliary light decision part 146 (and example of an auxiliary light decision part), and a light emission controller 147.

The external flash detector 144 decides whether or not an external flash is mounted to the hot shoe 161. More specifically, the external flash detector 144 decides whether or not the external flash 300 is mounted to the hot shoe 161 by detecting the voltage of the external flash detection terminal 164. If the voltage of the external flash detection terminal 164 is at ground level, the external flash detector 144 decides that an external flash is mounted to the hot shoe 161, and if the voltage of the external flash detection terminal 164 is higher than ground level, it is decided that an external flash has not been mounted to the hot shoe 161.

The external flash decision part 145 decides whether or not the external flash mounted to the hot shoe 161 is compatible with video autofocusing. More specifically, a flash controller is installed in the external flash, and video autofocusing information indicating whether or not an external flash is compatible with video autofocusing (an example of specification identification information) is stored at a specific address of the flash controller. The external flash decision part 145 acquires video autofocusing information from the flash controller, and decides whether or not the external flash is compatible with video autofocusing on the basis of the acquired video autofocusing information.

More precisely, if an external flash is compatible with video autofocusing, the video autofocusing information includes data indicating "video autofocusing compatible," and if the external flash is not compatible with video autofocusing, the video autofocusing information includes data indicating "video autofocusing incompatible." If the external flash has an external main light source and an external auxiliary light source, and the video autofocusing information is video autofocusing compatible, that means that the external auxiliary light source is compatible with video autofocusing, and if the video autofocusing information is video autofocusing incompatible, that means that the external auxiliary light source is not compatible with video autofocusing. In this embodiment, since the camera body 100 has the optical filter 114, when the external auxiliary light source emits red light, the external auxiliary light source is compatible with video autofocusing, and when the external auxiliary light source emits infrared light or near infrared light, the external auxiliary light source is compatible with video autofocusing.

If video autofocusing information itself is not stored at a specific address of the flash controller, the external flash decision part 145 cannot acquire video autofocusing information from the flash controller. In this case, it is possible that the external flash is not compatible with video autofocusing, and the external flash decision part 145 decides that the external flash is not compatible with video autofocusing.

The auxiliary light decision part 146 decides whether or not to use auxiliary light on the basis of the selected emission mode. The emission mode is selected by using a menu displayed on the camera monitor 120, for example. Possible emission modes include a mode in which auxiliary light is forcibly used (forced emission mode), a mode in which the use of auxiliary light is prohibited (emission prohibited mode), and a mode in which the use of auxiliary light is automatically selected (automatic emission mode). The auxiliary light decision part 146 decides to use auxiliary light if the forced emission mode is selected, and decides not to use auxiliary light if the emission prohibited mode is selected. Furthermore, if the automatic emission mode is selected, it is decided to use auxiliary light if the brightness of an image reproduced by image data outputted from the CMOS image sensor 110 is lower than a specific reference brightness. The system may also be such that it is decided not to use auxiliary light if the camera is too far from the subject.

The light emission controller 147 controls the internal main light source 191, the internal auxiliary light source 192, or an external flash mounted to the hot shoe 161, according to the emission mode that is set. More specifically, if the emission mode is set to forced emission mode, the light emission controller 147 causes the internal main light source 191, the internal auxiliary light source 192, or the external flash to emit light during photography. If the emission mode is set to automatic emission mode and the brightness of the image is low, it causes the internal main light source 191, the internal auxiliary light source 192, or the external flash to emit light during photography.

If it is decided by the external flash detector 144 that an external flash is mounted to the hot shoe 161, the light emission controller 147 uses the external flash preferentially on the basis of this decision result.

The light emission controller 147 controls the external flash so that the external main light source of the external flash emits light intermittently during video autofocusing on the basis of the decision result of the auxiliary light decision part 146 and the external flash decision part 145. More specifically, when the auxiliary light decision part 146 decides that auxiliary light is to be used, and the external flash decision part 145 decides that the external flash is not compatible with video autofocusing, the light emission controller 147 controls the external flash so that the external main light source emits light intermittently. This control of intermittent light emission will be discussed below.

The auxiliary light decision part 146 is an example of a first decision result, and the decision result of the external flash detector 144 is an example of a second decision result.

2: Autofocus 2-1: Video Autofocusing

The camera body 100, unlike a single lens reflex camera, does not have a mirror box device, nor does it have a phase difference detection unit that receives light guided by a mirror box device and performs phase difference autofocusing. The camera body 100 performs autofocusing on the basis of image data obtained by the CMOS image sensor 110. More specifically, the position of the focus lens 230 is changed to output sequential image data from the CMOS image sensor 110, and a contrast evaluation value is calculated on the basis of each piece of image data. The focal state can be adjusted by moving the focus lens 230 to the position of the focus lens 230 corresponding to the greatest evaluation value calculated. Autofocusing such as this is defined as video autofocusing.

With the above-mentioned video autofocusing, if the subject is dark, the contrast will be low in an image reproduced from the acquired image data, and it will be difficult to obtain an evaluation value with which video autofocusing precision can be ensured.

Figure 8:
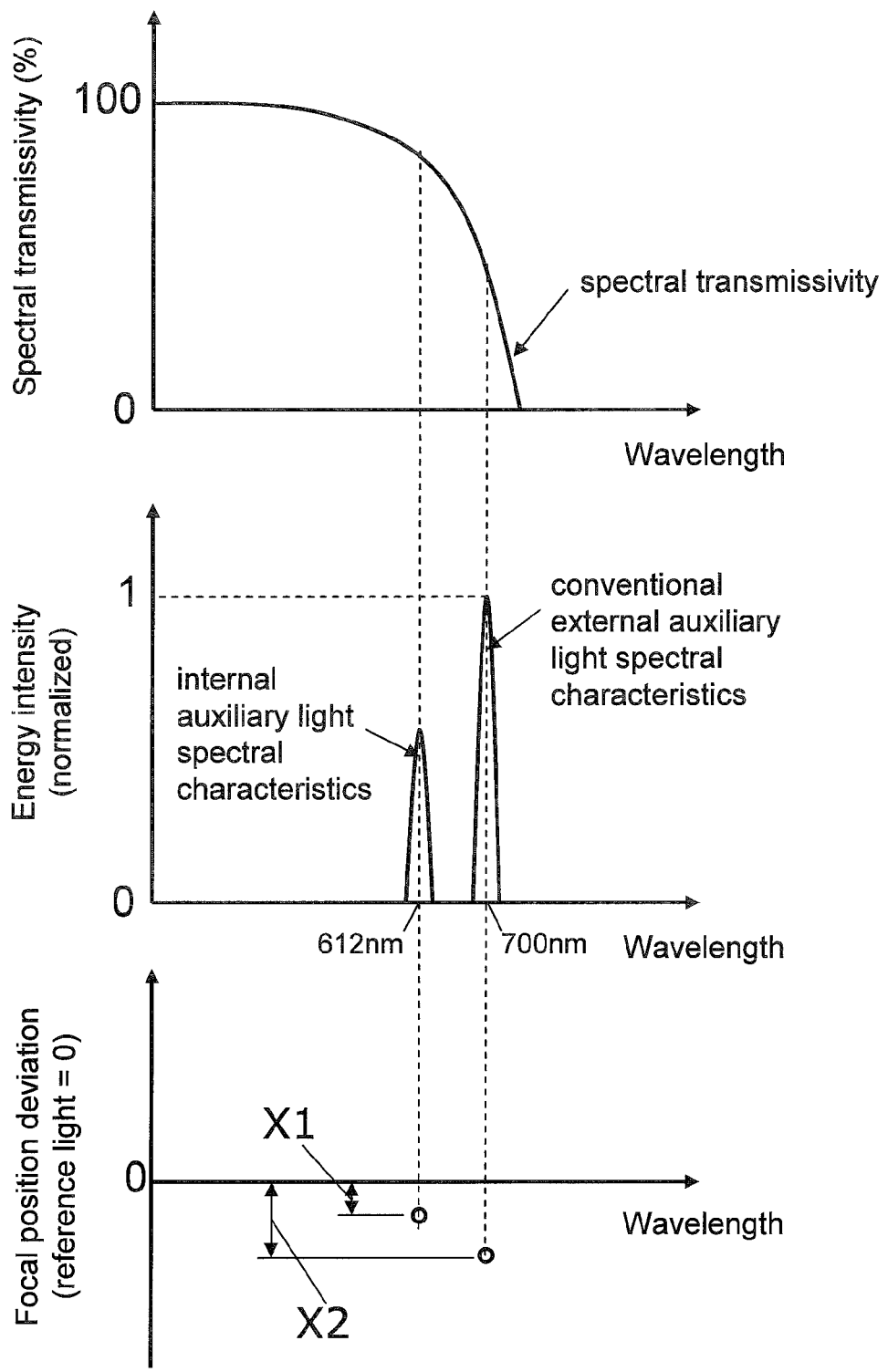
FIG. 8 is a graph of the emission spectrum distribution of auxiliary light and the spectral transmissivity of an optical filter 114.

In view of this, if the subject is dark on the basis of image data, it is possible to shine light on the subject by having the internal auxiliary light source 192 emit light. FIG. 8 is a graph of the spectral characteristics of auxiliary light and the spectral transmissivity of the optical filter 114. The internal auxiliary light source 192 emits light that is not cut out by the optical filter 114. More specifically, the optical filter 114 cuts out light whose wavelength is longer than that of red light (mainly near infrared light), but the internal auxiliary light source 192 emits red light that is not readily cut out by the optical filter 114. Therefore, any light that is shined by the internal auxiliary light source 192 on the subject and reflected by the subject is transmitted through the optical filter 114 and reaches the CMOS image sensor 110.

2-2: When an External Flash is Mounted

The internal main light source 191 and the internal auxiliary light source 192 emit less light when made smaller in size. Accordingly, if the subject is so distant from the photography site that the light of the internal main light source 191 or the internal auxiliary light source 192 will not reach the subject, or if the subject cannot be illuminated brightly enough, an externally attached flash device such as the external flash 300 is used. With an externally attached flash device, the camera body 100 does not become any bulkier, a large light source with a large quantity of light can be used, and a sufficient quantity of light can be ensured.

The external auxiliary light source 302, which emits light that is not readily cut out by the optical filter 114, is employed for the external flash 300 corresponding to the camera body 100. More specifically, the external auxiliary light source 302 emits red light that is not readily cut out by the optical filter 114. Accordingly, even if the external auxiliary light source 302 is used during autofocusing, for example, the evaluation value can still be calculated accurately, and autofocusing precision can be ensured. Therefore, if an external flash 300 corresponding to video autofocusing is mounted to the camera body 100, and it is decided that auxiliary light is necessary to acquire an evaluation value, then the camera controller 140 controls the external flash 300 so that the external auxiliary light source 302 emits light during video autofocusing.

With the external flash 400 in a comparative example, however, the light emitted by the external auxiliary light source 402 is near infrared light. Accordingly, when the external auxiliary light source 402 is used, light incident on the lens unit 200 from a subject illuminated by the external auxiliary light source 402 is cut out by the optical filter 114, and not enough light reaches the CMOS image sensor 110. Thus, if video autofocusing is performed using the external flash 400, there is the risk of diminished autofocusing precision. That is, unlike with the external flash 300, the external flash 400 can be considered to be a flash device that is not compatible with video autofocusing.

In view of this, with the camera body 100 in this embodiment, if a external flash 400 that is not compatible with video autofocusing is mounted, the external auxiliary light source 402 is not used, and video autofocusing is performed using the external main light source 301 instead. FIG. 9 is a flowchart related to the use of auxiliary light during video autofocusing.

When the release button 131 is pressed to start video autofocusing (step S01), the camera controller 140 decides whether or not to use auxiliary light (step S02). More specifically, whether or not to use auxiliary light is decided by the auxiliary light decision part 146. For example, the auxiliary light decision part 146 decides to use auxiliary light if a mode in which the flash is used forcibly (forced emission mode) is set, and decides not to use auxiliary light if a mode in which the use of a flash is prohibited (emission prohibited mode) is set. If a mode in which the use of a flash is automatically selected (automatic emission mode) is set, then if the brightness of an image reproduced by image data outputted from the CMOS image sensor 110 is less than a specific reference brightness, the auxiliary light decision part 146 decides to use auxiliary light. It may also decide not to use auxiliary light if the subject is too far away. If the auxiliary light decision part 146 has decided not to use auxiliary light (No in step S02), video autofocusing is performed without the use of auxiliary light (step S03). More specifically, the control of the light source by the light emission controller 147 is not performed in video autofocusing in this situation.

On the other hand, if the auxiliary light decision part 146 decides to use auxiliary light (Yes in step S02), the camera controller 140 decides whether or not an external flash is mounted to the hot shoe 161 of the camera body 100 (step S04). More specifically, it is decided by the external flash detector 144 whether or not an external flash is mounted to the hot shoe 161. If the external flash detector 144 decides that no external flash is mounted (No in step S04), the light emission controller 147 causes the internal auxiliary light source 192 to emit light, and the camera controller 140 performs video autofocusing in a state in which light is shined on the subject (step S05). Here, since the evaluation value is calculated in a state in which light from the internal auxiliary light source 192 is shined on the subject, the focus of the light from the internal auxiliary light source 192 (hereinafter also referred to as internal auxiliary light) is located on the imaging face of the CMOS image sensor 110 at the position of the focus lens 230 with the greatest evaluation value.

However, since no internal auxiliary light is used in actually acquiring image data, the wavelength of the light when video autofocusing is performed is different from the wavelength of light during actual photography. Since the focal position varies with the wavelength of light, the focal position of the internal auxiliary light is different from the focal position of light during photography.

Figure 10A:
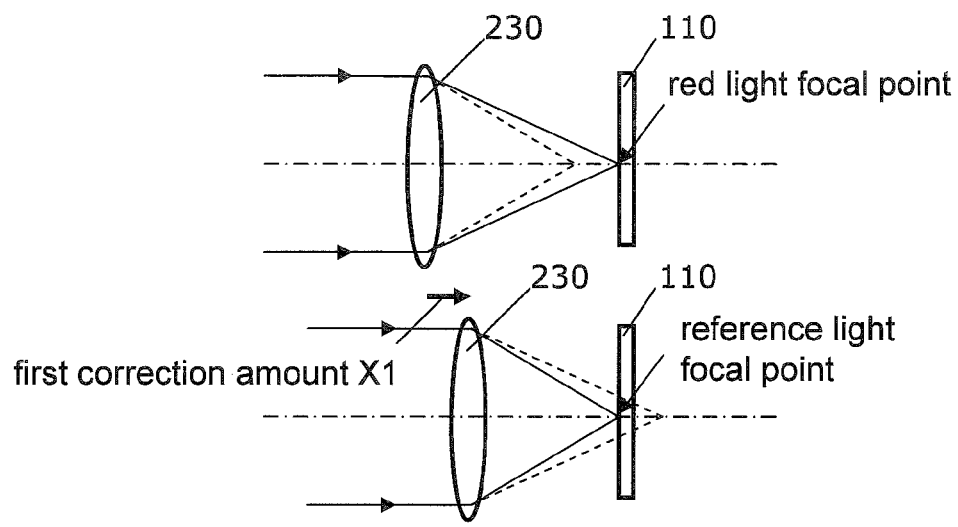
FIG. 10A is a concept diagram of focal position correction when auxiliary light is used (in the case of internal auxiliary light, or in the case of external auxiliary light that is compatible with video autofocusing)

Therefore, it is necessary to correct so that the focal point of light during photography is located on the imaging face of the CMOS image sensor 110. This will be described in detail through reference to FIGS. 10A and 10B. FIG. 10A is a concept diagram of focal position correction when auxiliary light is used. FIG. 10A is a concept diagram of focal position correction in the case of internal auxiliary light or in the case of video autofocusing compatible external auxiliary light.

As shown in FIG. 10A, with the lens unit 200, reference light of a specific wavelength is decided as the light used during photography, and the amount of deviation in the focal position of the reference light and the focal position of the internal auxiliary light corresponding to the position of the focus lens 230 and the position of the zoom lens 210, respectively, is calculated or measured as a design value. The lens unit 200 stores an amount X1 (hereinafter also referred to as the first correction amount) that the focus lens 230 is moved in order to correct the deviation in the focal position of the internal auxiliary light and the focal position of the reference light, according to the position of the zoom lens 210 and the position of the focus lens 230, respectively. Put another way, the first correction amount X1 is information indicating how much the focus lens 230 has to be moved from a state in which the internal auxiliary light is focused on the CMOS image sensor 110 for the reference light to be focused on the CMOS image sensor 110. A correction part 148 of the camera controller 140 acquires from the lens controller 240 of the lens unit 200 data related to the relation between the first correction amount X1 and the position of the zoom lens and the position of the focus lens 230 when the lens unit 200 is mounted or when the power is turned on, for example. When the internal auxiliary light is shined on the subject and video autofocusing is performed (step S05), the focus lens 230 is moved from its position at which the evaluation value was greatest, by the first correction amount X1 corresponding to the position of the focus lens 230 and the position of the zoom lens. Consequently, the reference light is focused on the CMOS image sensor 110. The reference light is light that has a wavelength with high spectral characteristics, such as sunlight or fluorescent light. For example, green light may be used as the reference light.

Returning to FIG. 9, if the external flash detector 144 decides that an external flash is mounted (Yes in step S04), the external flash decision part 145 decides whether or not the external flash is compatible with video autofocusing (step S06). More specifically, video autofocusing information is stored ahead of time in the flash controller 303, for example, and the external flash decision part 145 requests this information from the flash controller 303. The external flash decision part 145 decides that the mounted external flash is compatible with video autofocusing if the received video autofocusing information indicates video autofocusing compatibility (Yes in step S06), and decides that the mounted external flash is not compatible with video autofocusing if the video autofocusing information indicates video autofocusing incompatibility or if the external flash decision part 145 could not acquire video autofocusing information (No in step S06). The video autofocusing information is set to video autofocusing incompatible if the light of the external auxiliary light source is near infrared light, and is set to video autofocusing compatible if the light of the external auxiliary light source is visible light that includes red light. That is, the video autofocusing information can also be called light source identification information for deciding whether or not the external flash has an external auxiliary light source that emits near infrared light. It can be decided that the external flash has an external auxiliary light source that emits near infrared light if the video autofocusing information is video autofocusing incompatible, and it can be decided that the external flash does not have an external auxiliary light source that emits near infrared light if the video autofocusing information is video autofocusing incompatible.

If it is decided that the external flash is compatible with video autofocusing (Yes in step S06), such as when the external flash 300 is mounted, the camera controller 140 issues a command to the flash controller 303 so that the external auxiliary light source 302 emits light, and the flash controller 303 causes the external auxiliary light source 302 to emit light on the basis of this command. Video autofocusing is performed in a state in which light is shined on the subject (step S07). Here, just as with video autofocusing internal auxiliary light (step S05), the first correction amount X1 is used to correct any deviation that occurs between the focal position of the light of the external auxiliary light source 302 and the focal position of the reference light.

If it is decided that the external flash is not compatible with video autofocusing (No in step S06), such as when the external flash 400 is mounted to the hot shoe 161, then the light emission controller 147 causes the external main light source 301 to emit light intermittently via the flash controller 303, and video autofocusing is performed in a state in which light is shined intermittently on the subject (step S08). More specifically, the intermittent emission by the external main light source 301 is synchronized with the acquisition of image data for calculating the evaluation value, and continues during the exposure period for acquiring image data.

Figure 11:
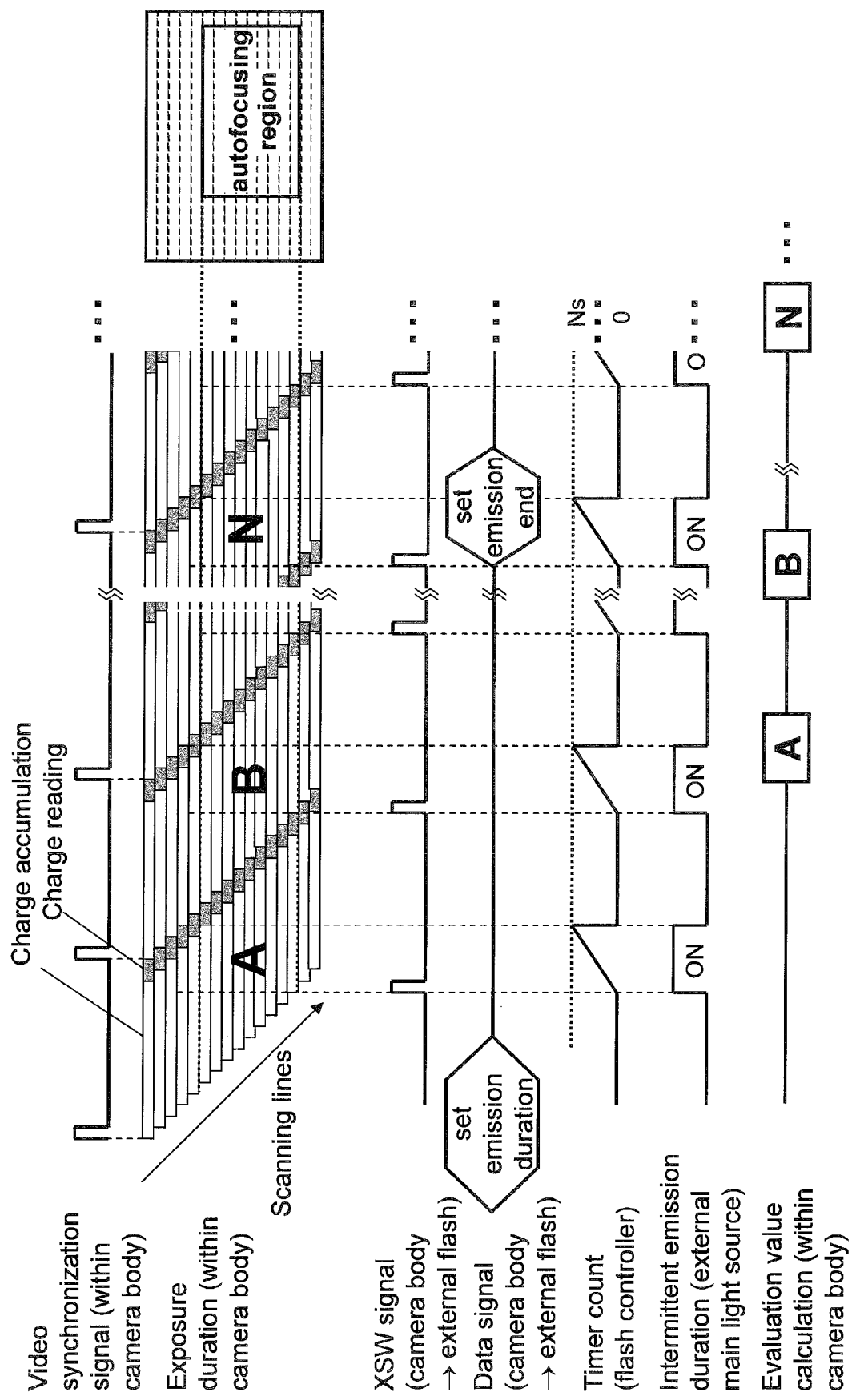
FIG. 11 is a timing chart of the intermittent emission of an external main light source 301 during video autofocusing.

A specific example of the intermittent emission by the external main light source 301 (step S08) will be described in detail through reference to FIG. 11. FIG. 11 is a timing chart of the intermittent emission of the external main light source 301 during video autofocusing.

The camera controller 140 generates video synchronization signals at a specific period, such as 30 Hz or 60 Hz. The timing generator 112 controls the operation of the CMOS image sensor 110 in synchronization with the video synchronization signals. The CMOS image sensor 110 performs charge accumulation by exposure and the reading of the charge in synchronization with the video synchronization signals. More specifically, charge accumulation and charge reading is performed from the line above the CMOS image sensor 110. The timing at which the charges are read, that is, the timing at which the accumulation of charges is begun, is staggered from the line above.

When an evaluation value is calculated on the basis of image data for a partial region (autofocusing region) of the CMOS image sensor 110, the camera controller 140 extracts the lines in which the autofocusing region is included, and sets the light emission duration and the emission commencement time of the external main light source 301 so that the light of the external main light source 301 will hit these lines for the same length of time. The emission commencement time is, for example, the charge accumulation commencement time for the line at which the accumulation of charge is the latest of all the extracted lines. The emission duration is, for example, the period from the charge accumulation commencement time until the charge accumulation end time (charge reading commencement time) for the line at which the accumulation of charge ends earliest of all the extracted lines. The camera controller 140 sends the XSW signal, which expresses the emission commencement time with a pulse signal, to the flash controller 303 via the XSW signal terminal 163 and the XSW signal terminal 363. Information related to the emission duration is sent to the flash controller 303 via the data signal terminal 162 and the data signal terminal 362 prior to the start of video autofocusing.

The flash controller 303 sets the upper limit value Ns of a timer on the basis of information related to the emission duration prior to the start of video autofocusing. When an XSW signal is then received, the external main light source 301 begins emitting light, and the counting of the timer is started. Once the timer reaches the upper limit value Ns, the emission of light from the external main light source 301 is ended, and the timer is reset. In this way the external main light source 301 emits light intermittently.

After image data is acquired for the autofocusing region, the camera controller 140 calculates an evaluation value on the basis of this data. An adequate evaluation value can be acquired by having the external main light source 301 emit light for the exposure duration of the autofocusing region (the charge accumulation duration).

Once video autofocusing is finished, the camera controller 140 sends information indicating the end of intermittent emission to the flash controller 303 via the data signal terminal 162 and the data signal terminal 362. The flash controller 303 ends the intermittent emission control mode.

If it is decided in step SO4 that an external flash is mounted, then the camera controller 140 causes the external main light source 301 to emit light via the flash controller 303 when still picture photography is performed after video autofocusing. The camera controller 140 may also control the external main light source 301 so as to prohibit light emission.

3: Aspects

As described above, with this camera body 100, if it is decided to use auxiliary light, and it is decided that the external auxiliary light source of the external flash is not compatible with video autofocusing, the CMOS image sensor 110 and the external flash are controlled so that image data is acquired while the external main light source of the external flash emits light intermittently. Accordingly, even if an external flash that is not compatible with video autofocusing (such as the external flash 400) is mounted, video autofocusing can still be performed by using the external main light source, and there will be no decrease in video autofocusing precision with an external flash that is not compatible with video autofocusing.

Also, if an external flash that is compatible with video autofocusing (such as the external flash 300) is mounted to the camera body 100, video autofocusing can be performed by using the external auxiliary light source.

In other words, with this camera body 100, it is possible to ensure interchangeability with various external flashes.

Also, if it is decided to use auxiliary light, and it is decided that the external auxiliary light source of the external flash is not compatible with video autofocusing, the external flash is controlled so that the external main light source emits light intermittently in synchronization with the charge accumulation duration of the CMOS image sensor 110. Accordingly, the precision of the evaluation value can be increased, and video autofocusing precision can be improved.

Furthermore, the camera controller 140 acquires video autofocusing information related to whether or not the external auxiliary light source is compatible with video autofocusing from the external flash mounted to the hot shoe 161, and decides whether or not the external auxiliary light source is compatible with video autofocusing on the basis of video autofocusing information.

More precisely, the camera controller 140 decides that the external auxiliary light source is compatible with video autofocusing if the video autofocusing information is video autofocusing compatible, and decides that the external auxiliary light source is not compatible with video autofocusing if the video autofocusing information is video autofocusing incompatible. Also, taking into account the fact that an external flash that is not compatible with video autofocusing is very likely not to have video autofocusing information, the camera controller 140 decides that the external auxiliary light source is not compatible with video autofocusing if video autofocusing information cannot be acquired from the external flash.

With the above configuration, whether or not an external flash is compatible with video autofocusing can be accurately decided. Also, even if an external flash for which video autofocusing compatibility was not originally taken into account is mounted, the precision of video autofocusing can be ensured for the camera body 100 in a photography situation that requires auxiliary light.

Second Embodiment

The following description will focus on differences from the camera body 100 in the first embodiment, and portions that are shared with the first embodiment will not be described again. Also, components that have substantially the same function as in the first embodiment will be numbered the same. The camera body 100 according to the second embodiment differs from the camera body 100 of the first embodiment in its operation when an external flash that is not compatible with video autofocusing is mounted. The rest of the configuration is the same as that in the first embodiment.

FIG. 12 is a flowchart related to the use of auxiliary light during video autofocusing in a second embodiment. The operation from step SO1 to step S07 is the same as in the first embodiment.

As shown in FIG. 12, if it is decided that the external flash is not compatible with video autofocusing (No in step S06), such as when the external flash 400 is mounted to the hot shoe 161, the camera controller 140 causes the external auxiliary light source 402 to emit light via the flash controller 303, and video autofocusing is performed in a state in which light from the external auxiliary light source 402 is shined on the subject (step S09). The light from the external auxiliary light source 402 is very likely to be near infrared light, so most of the light from the subject is cut out by the optical filter 114. And since very little light is transmitted by the optical filter 114, the image reproduced from image data acquired by the CMOS image sensor 110 is not bright.

In view of this, the CMOS image sensor 110 emphasizes the signal from pixels where a red color filter is disposed during video autofocusing more than during still picture photography. More specifically, the ratio of the amplification factor of signals outputted from pixels where a red color filter is disposed (hereinafter also referred to as the red amplification factor) to the amplification factor of signals outputted from pixels where a blue color filter is disposed (hereinafter also referred to as the blue amplification factor) during video autofocusing is increased over the ratio of the red amplification factor to the blue amplification factor during still picture photography. Also, the ratio of the amplification factor of the red amplification factor to the amplification factor of signals outputted from pixels where a green color filter is disposed (hereinafter also referred to as the green amplification factor) during video autofocusing is increased over the ratio of the red amplification factor to the green amplification factor during still picture photography. Increasing the red amplification factor while suppressing the generation of noise in image data by suppressing the blue and green amplification factors increases the precision of the evaluation value based on image data for the subject produced using the light from the external auxiliary light source 402. Another method is to produce image data and calculate an evaluation value by using only signals from pixels where a red color filter is disposed, and not using signals from pixels where color filters of the other colors (blue and green) are disposed.

Figure 10B:
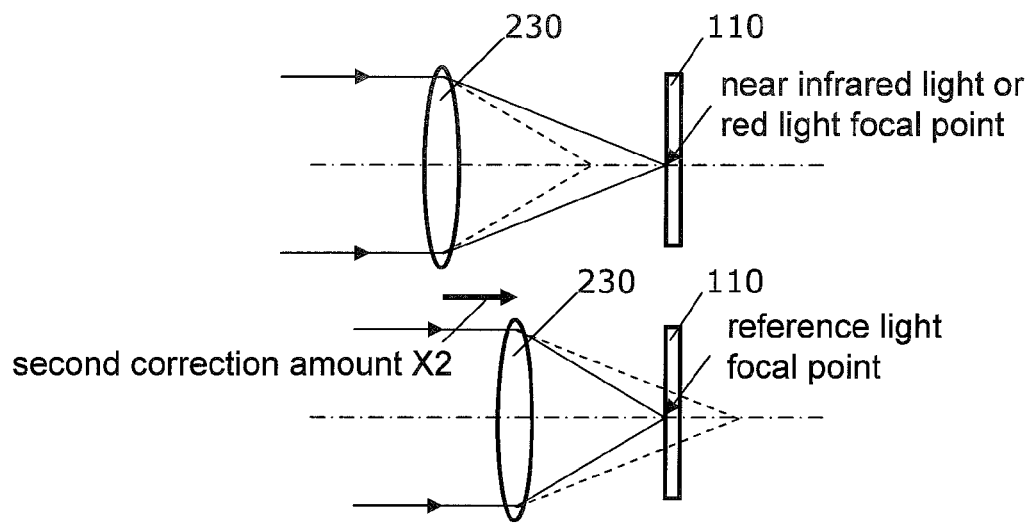
FIG. 10B is a concept diagram of focal position correction when auxiliary light is used (in the case of external auxiliary light that is incompatible with video autofocusing)

At the position of the focus lens 230 where the evaluation value is greatest, the light from the external auxiliary light source 402, which has a high probability of being near infrared light, is focused on the CMOS image sensor 110. Accordingly, correction is necessary so that the focal point of the light during photography will be located on the imaging face of the CMOS image sensor 110. This will be described in detail through reference to FIG. 10B. FIG. 10B is a concept diagram of focal position correction in the case of external auxiliary light that is video autofocusing incompatible.

The lens unit 200 also stores a second correction amount X2 in addition to the first correction amount X1. The amount of deviation in the focal position of the reference light and near infrared light corresponding to the position of the focus lens 230 and the position of the zoom lens, respectively, is calculated or measured as a design value. The lens unit 200 stores an amount X2 (hereinafter also referred to as the second correction amount) that the focus lens 230 is moved in order to correct the deviation in the focal positions of the near infrared light and the reference light, according to the position of the zoom lens 210 and the position of the focus lens 230, respectively. Put another way, the second correction amount X2 is information indicating how much the focus lens 230 has to be moved from a state in which the near infrared light is focused on the CMOS image sensor 110 for the reference light to be focused on the CMOS image sensor 110. The camera controller 140 acquires from the lens controller 240 of the lens unit 200 data related to the relation between the second correction amount X2 and the position of the zoom lens and the position of the focus lens 230 when the power is turned on. When the near infrared light from the external auxiliary light source 402 of the external flash 400, which is video autofocusing incompatible, is shined on the subject and video autofocusing is performed (step S09), the focus lens 230 is moved from its position at which the evaluation value was greatest, by the second correction amount X2 corresponding to the position of the focus lens 230 and the position of the zoom lens. Consequently, the reference light is focused on the CMOS image sensor 110.

With this embodiment, it is possible to perform video autofocusing by mounting the external flash 400, which is not compatible with video autofocusing, to the camera body 100. Therefore, it is possible to provide an autofocusing-compatible interchangeable lens type of digital camera that has interchangeability with external flashes.

Third Embodiment

The following description will focus on differences from the camera body 100 in the first embodiment, and portions that are shared with the first embodiment will not be described again. Also, components that have substantially the same function as in the first embodiment will be numbered the same. The camera body 100 according to the third embodiment differs from the camera body 100 of the first embodiment in its operation when an external flash that is not compatible with video autofocusing is mounted. The rest of the configuration is the same as that in the first embodiment.

FIG. 13 is a flowchart related to the use of auxiliary light during video autofocusing in a third embodiment. The operation from step SO1 to step S07 is the same as in the first embodiment.

As shown in FIG. 13, if it is decided to use auxiliary light, and the external flash decision part 145 decides that the external flash is not compatible with video autofocusing (No in step S06), the light emission controller 147 causes the internal main light source 191 to emit light during video autofocusing, and the camera controller 140 performs video autofocusing in a state in which light is shined intermittently on the subject (step S10). More specifically, the intermittent emission of the internal main light source 191 is performed instead of the intermittent emission of the external main light source 301 in step S08 in the first embodiment, and the rest of the operation is the same as in step S08 in the first embodiment. The intermittent emission of the internal main light source 191 is synchronized with the charge accumulation period of the CMOS image sensor 110.

Here again, it is possible to perform video autofocusing by mounting an external flash that is not compatible with video autofocusing to the camera body 100. Therefore, it is possible to provide a camera body 100 with which interchangeability with various external flashes can be ensured.

Fourth Embodiment

The following description will focus on differences from the camera body 100 in the first embodiment, and portions that are shared with the first embodiment will not be described again. Also, components that have substantially the same function as in the first embodiment will be numbered the same. The camera body 100 according to the fourth embodiment differs from the camera body 100 of the first embodiment in its operation when an external flash that is not compatible with video autofocusing is mounted. The rest of the configuration is the same as that in the first embodiment.

FIG. 14 is a flowchart related to the use of auxiliary light during video autofocusing in a fourth embodiment. The operation from step SO1 to step S07 is the same as in the first embodiment.

As shown in FIG. 14, if it is decided to use auxiliary light, and it is decided that the external flash is not compatible with video autofocusing (that is, that the external flash mounted to the hot shoe 161 has an external auxiliary light source that emits near infrared light) (No in step S06), the camera controller 140 controls the internal auxiliary light source so that the internal auxiliary light source 192 emits light intermittently during video autofocusing, and video autofocusing is performed in a state in which light is shined on the subject (step S11). More specifically, the same operation as in step S05 of the first embodiment is performed.

Here again, it is possible to perform video autofocusing by mounting an external flash that is not compatible with video autofocusing to the camera body 100. Therefore, it is possible to provide a camera body 100 with which interchangeability with various external flashes can be ensured.

In this embodiment, the internal auxiliary light source 192 is preferably a light source that emits a relatively large amount of light.

Fifth Embodiment

The following description will focus on differences from the camera body 100 in the first embodiment, and portions that are shared with the first embodiment will not be described again. Also, components that have substantially the same function as in the first embodiment will be numbered the same. The camera body 100 according to the fifth embodiment differs from the camera body 100 of the first embodiment in its operation when an external flash that is not compatible with video autofocusing is mounted. The rest of the configuration is the same as that in the first embodiment.

FIG. 15 is a flowchart related to the use of auxiliary light during video autofocusing in a fourth embodiment. The operation from step S01 to step S07 is the same as in the first embodiment.

As shown in FIG. 15, if it is decided that the external flash is not compatible with video autofocusing (No in step S06), such as when the external flash 400 is mounted, the camera controller 140 causes the internal main light source 191 (an example of a light source) to emit light continuously (rather than intermittently), and video autofocusing is performed in a state in which light is shined on the subject (step S12).

In this embodiment, the internal main light source 191 can emit not only a flash, but also continuously. The internal main light source 191 also functions as a video light that continuously shines light on the subject during video photography, for example.

With this embodiment, it is possible to perform video autofocusing by mounting an external flash 400 that is not compatible with video autofocusing to the camera body 100. Therefore, it is possible to provide a camera body 100 with which interchangeability with various external flashes can be ensured.

In this embodiment, the internal auxiliary light source 192 preferably emits a large amount of light.

Other Embodiments

The technology disclosed herein is not limited to or by the above embodiments, and the following embodiments are also possible as embodiments of this technology.

(A)

In the above embodiments, both the internal main light source 191 and the internal auxiliary light source 192 were provided, but one or both of these may be eliminated.

(B)

In step S06 above, whether or not the external flash is compatible with video autofocusing is decided on the basis of video autofocusing information (or, whether or not the external flash has an external auxiliary light source that emits near infrared light is decided on the basis of light source identification information), but rather than using special information such as video autofocusing information, whether or not the external flash is compatible with video autofocusing may be decided using standard information. More specifically, it is possible to decide whether or not an external flash is compatible with video autofocusing on the basis of product identification information such as a stock number or model number that allows the external flash to be identified.

For example, product identification information such as a stock number or model number is stored in the flash controller of an external flash, and the camera controller 140 acquires the product identification information from the external flash mounted to the hot shoe 161 and decides whether or not the external auxiliary light source is compatible with video autofocusing on the basis of this product identification information.

In this case, the camera controller 140 stores a product list including product identification information about external flashes that have an external auxiliary light source that is compatible with video autofocusing, and if the product identification information acquired from the external flash mounted to the hot shoe 161 is included in the product list, it is decided that the external auxiliary light source of the external flash mounted to the hot shoe 161 is compatible with video autofocusing, but if the product identification information acquired from the external flash mounted to the hot shoe 161 is not included in the product list, it is decided that the external auxiliary light source of the external flash mounted to the hot shoe 161 is not compatible with video autofocusing.

Conversely, it is also possible to store a product list including product identification information about external flashes that have an external auxiliary light source that is not compatible with video autofocusing. More specifically, the camera controller 140 decides that the external auxiliary light source of the external flash mounted to the hot shoe 161 is compatible with video autofocusing if the product identification information acquired from the external flash mounted to the hot shoe 161 is not included in the product list, and decides that the external auxiliary light source of the external flash mounted to the hot shoe 161 is not compatible with video autofocusing if the product identification information acquired from the external flash mounted to the hot shoe 161 is included in the product list.

By using product identification information as discussed above, whether or not an external flash is compatible with video autofocusing can be accurately decided, just as with the embodiments given above. Here again, an external auxiliary light source is considered to be compatible with video autofocusing if its light is visible light that includes red.

One or more types of product identification information may be included in the product list.

(C)

In the embodiments, both the camera monitor 120 and the EVF 180 were provided, but the camera monitor 120 and/or the EVF 180 may be eliminated.

(D)

In the embodiments, an example was given of a configuration having the OIS lens 220, but this is not essential to the present invention. Specifically, the present invention can also be applied to a digital camera to which is mounted an interchangeable lens that does not have a shake correction function.

(E)

The electrical contacts 153 may be supported by the body mount ring 151. For instance, the electrical contacts 153 may be provided between the inner periphery and outer periphery of the body mount ring 151.

(F)

In the above embodiments, the camera body 100, unlike a single lens reflex camera, does not have a mirror box device, nor does it have a phase difference detection unit that receives subject light guided by a mirror box device and performs phase difference autofocusing.

However, the camera body 100 may have a phase difference detection unit that that receives subject light guided by a mirror box device and performs phase difference autofocusing. In this case, the camera body 100 retracts the mirror of the mirror box device from the optical path, and performs video autofocusing on the basis of image data acquired by the CMOS image sensor 110. More specifically, contrast autofocusing is performed by changing the position of the focus lens 230 and successively calculating evaluation values for contrast from the image data obtained from the CMOS image sensor 110. Even when video autofocusing is thus performed with a single lens reflex camera, the operation can be carried out as in the embodiments and video autofocusing can be performed by mounting a conventional flash device.

(G)

In steps S08, S10, and S11, the external auxiliary light source 302 may or may not emit light.

(H)

In step S12 in the fifth embodiment, a light source provided to the camera body separately from the internal main light source 191 (such as a video light (an example of an internal light source)) may emit light.

Aspects of Embodiments

The technology described above can be expressed as follows. The technology included in the above embodiments is not, however, limited to what is stated below. To obtain the effects discussed in the various aspects, configurations other than those of the given aspects may be modified or eliminated.

Aspect 1

The camera body according to aspect 1 comprises:

a body mount that supports a removable lens unit;

an imaging element that captures an optical image of a subject and produces image data;

a hot shoe that supports a removable flash device; and a camera controller that calculates an evaluation value on the basis of image data from the imaging element, and performs video autofocusing, wherein the camera controller controls so that when it is decided to use auxiliary light, and a flash device having an external auxiliary light source that is not compatible with video autofocusing is mounted, the external flash light source of the flash device is made to emit light intermittently, and the imaging element is made to acquire image data, and an evaluation value is calculated on the basis of this image data.

Consequently, it is possible to provide an interchangeable lens type of digital camera that is capable of video autofocusing and has interchangeability with conventional flash devices.

Aspect 2

The camera body according to aspect 2 is the camera body according to aspect 1, wherein, when it is decided to use auxiliary light, and a flash device having an external auxiliary light source that is not compatible with video autofocusing is mounted, the camera controller causes the external flash light source of the flash device to emit light intermittently in synchronization with the charge accumulation duration of the imaging element used to acquire the image data.

Consequently, video autofocusing of high precision is possible by using a conventional flash device even when the subject is dark.

Aspect 3

The camera body according to aspect 3 comprises:

a body mount that supports a removable lens unit;

an imaging element that captures an optical image of a subject and produces image data;

a hot shoe that supports a removable flash device; and a camera controller that calculates an evaluation value on the basis of image data from the imaging element, and performs video autofocusing, wherein the camera controller controls the imaging element so that when it is decided to use auxiliary light, and a flash device having an external auxiliary light source that is not compatible with video autofocusing is mounted, the external flash light source of the flash device is made to emit light, and image data is acquired by emphasizing signals from pixels where a red color filter is disposed more than during still picture photography.

Consequently, it is possible to provide an interchangeable lens type of digital camera that is capable of video autofocusing and has interchangeability with conventional flash devices.

Aspect 4

The camera body according to aspect 4 is the camera body according to aspect 3, wherein the imaging element is controlled so that the image data is acquired by emphasizing signals from pixels where a red color filter is disposed more than during still picture photography, by controlling the imaging element so that the image data is acquired by increasing the ratio of the amplification factor of signals from pixels where a red color filter is disposed to the amplification factor of signals from pixels where a blue color filter is disposed during video autofocusing over the ratio of the amplification factor of signals from pixels where a red color filter is disposed to the amplification factor of signals from pixels where a blue color filter is disposed during still picture photography, and/or the increasing ratio of the amplification factor of signals from pixels where a red color filter is disposed to the amplification factor of signals from pixels where a green color filter is disposed during video autofocusing over the ratio of the amplification factor of signals from pixels where a red color filter is disposed to the amplification factor of signals from pixels where a green color filter is disposed during still picture photography.

Consequently, an increase in image data noise can be suppressed while raising the precision of the evaluation value based on image data of the subject illuminated with light from the external auxiliary light source.

Aspect 5

The camera body according to aspect 5 is the camera body according to aspect 3, wherein the camera controller controls the imaging element so that image data is acquired by emphasizing signals from pixels where a red color filter is disposed more than during still picture photography, by controlling the imaging element so that image data is acquired solely on the basis of signals from pixels where a red color filter is disposed.

Consequently, an increase in image data noise can be suppressed while raising the precision of the evaluation value based on image data of the subject illuminated with light from the external auxiliary light source.

Aspect 6

The camera body according to aspect 6 is the camera body according to any of aspects 3 to 5, wherein the camera controller corrects deviation in the focal position between reference light and the light from an external auxiliary light source that is compatible with video autofocusing in the performance of video autofocusing in which an external auxiliary light source that is compatible with video autofocusing is made to emit light, and corrects deviation in the focal position between reference light and the light of an external auxiliary light source that is not compatible with video autofocusing in the performance of video autofocusing in which an external auxiliary light source that is not compatible with video autofocusing is made to emit light.

Consequently, focal precision can be enhanced.

Aspect 7

The camera body according to aspect 7 is the camera body according to any of aspects 3 to 5, wherein the camera controller uses a first correction amount that is the amount the focus lens is moved in order to correct deviation in the focal position between reference light and the light of an external auxiliary light source that is compatible with video autofocusing in the performance of video autofocusing in which an external auxiliary light source that is compatible with video autofocusing is made to emit light, and uses a second correction amount that is the amount the focus lens is moved in order to correct deviation in the focal position between reference light and the light of an external auxiliary light source that is not compatible with video autofocusing in the performance of video autofocusing in which an external auxiliary light source that is not compatible with video autofocusing is made to emit light.

Consequently, focal precision can be enhanced.

Aspect 8

The camera body according to aspect 8 comprises:

a body mount that supports a removable lens unit;

an imaging element that captures an optical image of a subject and produces image data;

a hot shoe that supports a removable flash device;

a light source capable of emitting light; and a camera controller that calculates an evaluation value on the basis of image data from the imaging element, and performs video autofocusing, wherein the camera controller controls so that when it is decided to use auxiliary light, and a flash device having an external auxiliary light source that is not compatible with video autofocusing is mounted, the light source is made to emit light, and the imaging element is made to acquire image data, and an evaluation value is calculated on the basis of this image data.

Consequently, it is possible to provide an interchangeable lens type of digital camera that is capable of video autofocusing and has interchangeability with conventional flash devices.

Aspect 9

The camera body according to aspect 9 is the camera body according to aspect 8, wherein the light source is an internal flash capable of emitting flash light, and when it is decided to use auxiliary light, and a flash device having an external auxiliary light source that is not compatible with video autofocusing is mounted, the camera controller causes the internal flash to emit light intermittently and causes the imaging element to acquire imaging device, and an evaluation value is calculated on the basis of this image data.

Aspect 10

The camera body according to aspect 10 is the camera body according to aspect 9, wherein, when it is decided to use auxiliary light, and a flash device having an external auxiliary light source that is not compatible with video autofocusing is mounted, the camera controller causes the internal flash to emit light intermittently in synchronization with the charge accumulation duration of the imaging element used to acquire the image data.

Aspect 11

The camera body according to aspect 11 is the camera body according to aspect 8, wherein the light source is an internal auxiliary light source capable of shining light on a subject, and when it is decided to use auxiliary light, and a flash device having an external auxiliary light source that is not compatible with video autofocusing is mounted, the camera controller causes the internal auxiliary light source to emit light and causes the imaging element to acquire imaging device, and an evaluation value is calculated on the basis of this image data.

Aspect 12

The camera body according to aspect 12 is the camera body according to any of aspects 1 to 11, wherein the camera controller acquires from the flash device information about the possibility of video autofocusing related to whether or not an external auxiliary light source is compatible with video autofocusing, and decides whether or not the external auxiliary light source of the flash device is compatible with video autofocusing on the basis of this video autofocusing possibility information.

Aspect 13

The camera body according to aspect 13 is the camera body according to aspect 12, wherein the camera controller decides that the external auxiliary light source of the mounted flash device is compatible with video autofocusing if the video autofocusing possibility information indicates that video autofocusing is possible, and decides that the external auxiliary light source of the mounted flash device is incompatible with video autofocusing if the video autofocusing possibility information indicates that video autofocusing is impossible.

Aspect 14

The camera body according to aspect 14 is the camera body according to any of aspects 1 to 11, wherein the camera controller acquires from the flash device stock number information related to the stock number of the mounted flash device, and decides whether or not the external auxiliary light source of the flash device is compatible with video autofocusing on the basis of this stock number information.

Aspect 15

The camera body according to aspect 15 is the camera body according to aspect 14, wherein the camera controller stores a list of stock number information about flash devices that have an external auxiliary light source that is compatible with video autofocusing, and decides that the external auxiliary light source of the mounted flash device is compatible with video autofocusing if the stock number information acquired from the mounted flash device matches the stock number information of the list, and decides that the external auxiliary light source of the mounted flash device is incompatible with video autofocusing if the stock number information acquired from the mounted flash device does not match the stock number information of the list.

Aspect 16

The camera body according to aspect 16 is the camera body according to aspect 14, wherein the stores a list of stock number information about flash devices that have an external auxiliary light source that is not compatible with video autofocusing, and decides that the external auxiliary light source of the mounted flash device is compatible with video autofocusing if the stock number information acquired from the mounted flash device does not match the stock number information of the list, and decides that the external auxiliary light source of the mounted flash device is incompatible with video autofocusing if the stock number information acquired from the mounted flash device matches the stock number information of the list Aspect 17

The camera body according to aspect 17 comprises:

a body mount that supports a removable lens unit;

an imaging element that captures an optical image of a subject and produces image data;

a hot shoe that supports a removable flash device; and a camera controller that calculates an evaluation value on the basis of image data from the imaging element, and performs video autofocusing, wherein the camera controller controls so that when it is decided to use auxiliary light, and a flash device having an external auxiliary light source that emits near infrared light is mounted, the external flash light source of the flash device is made to emit light intermittently, and the imaging element is made to acquire image data, and an evaluation value is calculated on the basis of this image data.

Aspect 18

The camera body according to aspect 18 is the camera body according to aspect 17, wherein, when it is decided to use auxiliary light, and a flash device having an external auxiliary light source that emits near infrared light is mounted, the camera controller causes the external flash light source of the flash device to emit light intermittently in synchronization with the charge accumulation duration of the imaging element used to acquire the image data.

Aspect 19

The camera body according to claim 19 comprises:

a body mount that supports a removable lens unit;

an imaging element that captures an optical image of a subject and produces image data;

a hot shoe that supports a removable flash device; and a camera controller that calculates an evaluation value on the basis of image data from the imaging element, and performs video autofocusing, wherein the camera controller controls the imaging element so that when it is decided to use auxiliary light, and a flash device having an external auxiliary light source that emits near infrared light is mounted, the external auxiliary light source of the flash device is made to emit light, and image data is acquired by emphasizing signals from pixels where a red color filter is disposed more than during still picture photography.

Aspect 20

The camera body according to aspect 20 is the camera body according to aspect 19 wherein the imaging element is controlled so that the image data is acquired by emphasizing signals from pixels where a red color filter is disposed more than during still picture photography, by controlling the imaging element so that the image data is acquired by increasing the ratio of the amplification factor of signals from pixels where a red color filter is disposed to the amplification factor of signals from pixels where a blue color filter is disposed during video autofocusing over the ratio of the amplification factor of signals from pixels where a red color filter is disposed to the amplification factor of signals from pixels where a blue color filter is disposed during still picture photography, and/or the increasing ratio of the amplification factor of signals from pixels where a red color filter is disposed to the amplification factor of signals from pixels where a green color filter is disposed during video autofocusing over the ratio of the amplification factor of signals from pixels where a red color filter is disposed to the amplification factor of signals from pixels where a green color filter is disposed during still picture photography.

Aspect 21

The camera body according to aspect 21 is the camera body according to aspect 19, wherein the camera controller controls the imaging element so that image data is acquired by emphasizing signals from pixels where a red color filter is disposed more than during still picture photography, by controlling the imaging element so that image data is acquired solely on the basis of signals from pixels where a red color filter is disposed.

Aspect 22

The camera body according to aspect 22 is the camera body according to any of aspects 19 to 21, wherein the camera controller corrects deviation in the focal position between reference light and red light in the performance of video autofocusing in which an external auxiliary light source that emits red light is made to emit light, and corrects deviation in the focal position between reference light and near infrared light in the performance of video autofocusing in which an external auxiliary light source that emits near infrared light is made to emit light.

Aspect 23

The camera body according to aspect 23 is the camera body according to any of aspects 19 to 21, wherein the camera controller uses a first correction amount that is the amount the focus lens is moved in order to correct deviation in the focal position between reference light and red light in the performance of video autofocusing in which an external auxiliary light source that emits red light is made to emit light, and uses a second correction amount that is the amount the focus lens is moved in order to correct deviation in the focal position between reference light and near infrared light in the performance of video autofocusing in which an external auxiliary light source that emits near infrared light is made to emit light.

Aspect 24

The camera body according to aspect 24 comprises:

a body mount that supports a removable lens unit;

an imaging element that captures an optical image of a subject and produces image data;

a hot shoe that supports a removable flash device;

a light source capable of emitting light; and a camera controller that calculates an evaluation value on the basis of image data from the imaging element, and performs video autofocusing, wherein the camera controller controls so that when it is decided to use auxiliary light, and a flash device having an external auxiliary light source that emits near infrared light is mounted, the light source is made to emit light, and the imaging element is made to acquire image data, and an evaluation value is calculated on the basis of this image data.

Aspect 25

The camera body according to aspect 25 is the camera body according to aspect 24, wherein the light source is an internal flash capable of emitting flash light, and when it is decided to use auxiliary light, and a flash device having an external auxiliary light source that emits near infrared light is mounted, the camera controller causes the internal flash to emit light intermittently and causes the imaging element to acquire imaging device, and an evaluation value is calculated on the basis of this image data.

Aspect 26

The camera body according to aspect 26 is the camera body according to aspect 25,
wherein, when it is decided to use auxiliary light, and a flash device having an external auxiliary light source that emits near infrared light is mounted, the camera controller causes the internal flash to emit light intermittently in synchronization with the charge accumulation duration of the imaging element used to acquire the image data.

Aspect 27

The camera body according to aspect 27 is the camera body according to aspect 24,
wherein the light source is an internal auxiliary light source capable of shining light on a subject, and
when it is decided to use auxiliary light, and a flash device having an external auxiliary light source that emits near infrared light is mounted, the camera controller causes the internal auxiliary light source to emit light and causes the imaging element to acquire imaging device, and an evaluation value is calculated on the basis of this image data.

What is claimed is:

1. A camera body to which a lens unit for forming an optical image of a subject and a flash device for shining light on the subject can be mounted, comprising:
    an imaging element configured to convert an optical image of the subject into an electrical signal, and configured to produce image data for the subject;
    a hot shoe to which the flash device can be mounted;
    an internal light source arranged to shine light on the subject; and
    a camera controller configured to calculate an evaluation value on the basis of the image data produced by the imaging element, and configured to perform video autofocusing on the basis of the evaluation value,
    the camera controller configured to control the imaging element and the internal light source so that when the camera controller decides auxiliary light is needed, and the camera controller decides that the flash device mounted to the hot shoe has an external auxiliary light source arranged to emit near infrared light, the image data is acquired while the internal light source emits light during the video autofocusing, wherein
    the camera controller is configured to acquire, from the flash device mounted to the hot shoe, light source identification information related to whether or not the flash device has the external auxiliary light source arranged to emit near infrared light and is configured to decide whether or not the flash device has the external auxiliary light source on the basis of the light source identification information.

2. The camera body according to claim 1, wherein
the internal light source is an internal main light source arranged to shine light on the subject, and
the camera controller is configured to control the internal main light source so that when the camera controller decides that the auxiliary light is needed, and the camera controller decides that the flash device mounted to the hot shoe has the external auxiliary light source arranged to emit near infrared light, the internal main light source emits light intermittently during the video autofocusing.

3. The camera body according to claim 2, wherein,
the camera controller is configured to control the internal main light source so that when the camera controller decides that the auxiliary light is needed, and the camera controller decides that the flash device mounted to the hot shoe has the external auxiliary light source arranged to emit near infrared light, the internal main light source emits light intermittently and in synchronization with the charge accumulation period of the imaging element.

4. The camera body according to claim 2, wherein
the camera controller is configured to acquire, from the flash device mounted to the hot shoe, light source identification information related to whether or not the flash device has the external auxiliary light source arranged to emit near infrared light, and is configured to decide whether or not the flash device has the external auxiliary light source on the basis of the light source identification information.

5. The camera body according to claim 1, wherein
the internal light source is an internal auxiliary light source for shining light on the subject, and
the camera controller is configured to control the internal auxiliary light source so that when the camera controller decides that the auxiliary light is needed, and the camera controller decides that the flash device mounted to the hot shoe has the external auxiliary light source arranged to emit near infrared light, the internal auxiliary light source emits light intermittently during the video autofocusing.

6. The camera body according to claim 1, wherein
the camera controller is configured to decide that the flash device has the external auxiliary light source arranged to emit near infrared light if the light source identification information cannot be acquired from the flash device.

7. The camera body according to claim 1, wherein
the camera controller has an auxiliary light determination part configure to decide whether or not to use the auxiliary light; a flash device decision part configured to decide whether or not the flash device mounted to the hot shoe has the external auxiliary light source arranged to emit near infrared light; and a light emission controller configured to control the flash device on the basis of a first decision result of the auxiliary light determination part and a second decision result of the auxiliary light determination part, so that an external main light source emits light intermittently during the video autofocusing.

8. A camera body to which a lens unit for forming an optical image of a subject and a flash device for shining light on the subject can be mounted, comprising:
    an imaging element configured to convert an optical image of the subject into an electrical signal, and configured to produce image data for the subject
    a hot shoe to which the flash device can be mounted;
    an internal light source arranged to shine light on the subject and
    a camera controller configured to calculate an evaluation value on the basis of the image data produced by the imaging element, and configured to perform video autofocusing on the basis of the evaluation value,
    the camera controller configured to control the imaging element and the internal light source so that when the camera controller decides the auxiliary light is needed, and the camera controller decides that the flash device mounted to the hot shoe has an external auxiliary light source arranged to emit near infrared light, the image data is acquired while the internal light source emits light during the video autofocusing, wherein
    the camera controller is configured to acquire, from the flash device mounted to the hot shoe, product identification information for identifying the flash device, and is configured to decide whether or not the flash device has the external auxiliary light source on the basis of the product identification information.

9. The camera body according to claim 8, wherein the camera controller stores a product list including product identification information about flash devices having the external auxiliary light source arranged to emit near infrared light, if the product identification information acquired from the flash device mounted to the hot shoe is included in the product list, the camera controller decides that the external auxiliary light source of the flash device mounted to the hot shoe is compatible with the video autofocusing, and if the product identification information acquired from the flash device mounted to the hot shoe is not included in the product list, the camera controller decides that the mounted flash device has the external auxiliary light source arranged to emit near infrared light.

10. The camera body according to claim 8, wherein the camera controller stores a product list including product identification information about flash devices not having the external auxiliary light source arranged to emit near infrared light, if the product identification information acquired from the flash device mounted to the hot shoe is not included in the product list, the camera controller decides that the flash device mounted to the hot shoe has the external auxiliary light source arranged to emit near infrared light, and if the product identification information acquired from the flash device mounted to the hot shoe is included in the product list, the camera controller decides that the flash device mounted to the hot shoe does not have the external auxiliary light source arranged to emit near infrared light.

* * * * *